United States Patent [19]
Mai et al.

[11] Patent Number: 5,298,043
[45] Date of Patent: Mar. 29, 1994

[54] FILTER SYSTEM FOR SMOKE OR POLLUTED AIR

[76] Inventors: Sung-chuan Mai, 87 Tso-yin Big Road; Kung-ming Mai, 355 Shih-chuan second Road, both of Kaohsiung City, Taiwan

[21] Appl. No.: 943,389

[22] Filed: Sep. 10, 1992

[30] Foreign Application Priority Data

May 19, 1992 [CN] China .................. 92103597

[51] Int. Cl.$^5$ .............................................. B01D 47/12
[52] U.S. Cl. ........................................ 55/223; 55/228; 55/259
[58] Field of Search ................... 55/94, 223, 228, 242, 55/259, 269

[56] References Cited

U.S. PATENT DOCUMENTS

| | | | |
|---|---|---|---|
| 3,616,597 | 11/1971 | Stewart | 55/94 X |
| 4,170,458 | 10/1979 | Hartwick | 55/94 X |
| 4,830,761 | 5/1989 | Leach et al. | 55/228 X |
| 4,929,258 | 5/1990 | Chin-Hua | 55/94 X |
| 4,979,967 | 12/1990 | Walter et al. | 55/94 X |
| 5,192,345 | 3/1993 | Pala | 55/223 |

Primary Examiner—Charles Hart
Attorney, Agent, or Firm—Bucknam and Archer

[57] ABSTRACT

A filter system for smoke or polluted air comprises a smoke or polluted air filter device, a bag filter device, and a water treatment device. A duct and a plurality of power sprayers are provided in the smoke or polluted air filter device to remove harmful substances in the smoke or the polluted air. A plurality of filtering bags are provided in the bag filter device to clean the waste liquid coming from the smoke or polluted air filter device. A plurality of treating troughs are provided in the water treatment device to purify the liquid flowing down from the filter bag device. A coarse ash collecting device is provided additionally in the filter system to collect particle ashes or dusts in the smoke before entering the smoke or polluted air filter device. Ingredients such as carbon ashes, grease or oily substances, offensive odors, poisonous substances, and etc. contained in the smoke or the polluted air may be suitably treated by the filter system.

34 Claims, 22 Drawing Sheets

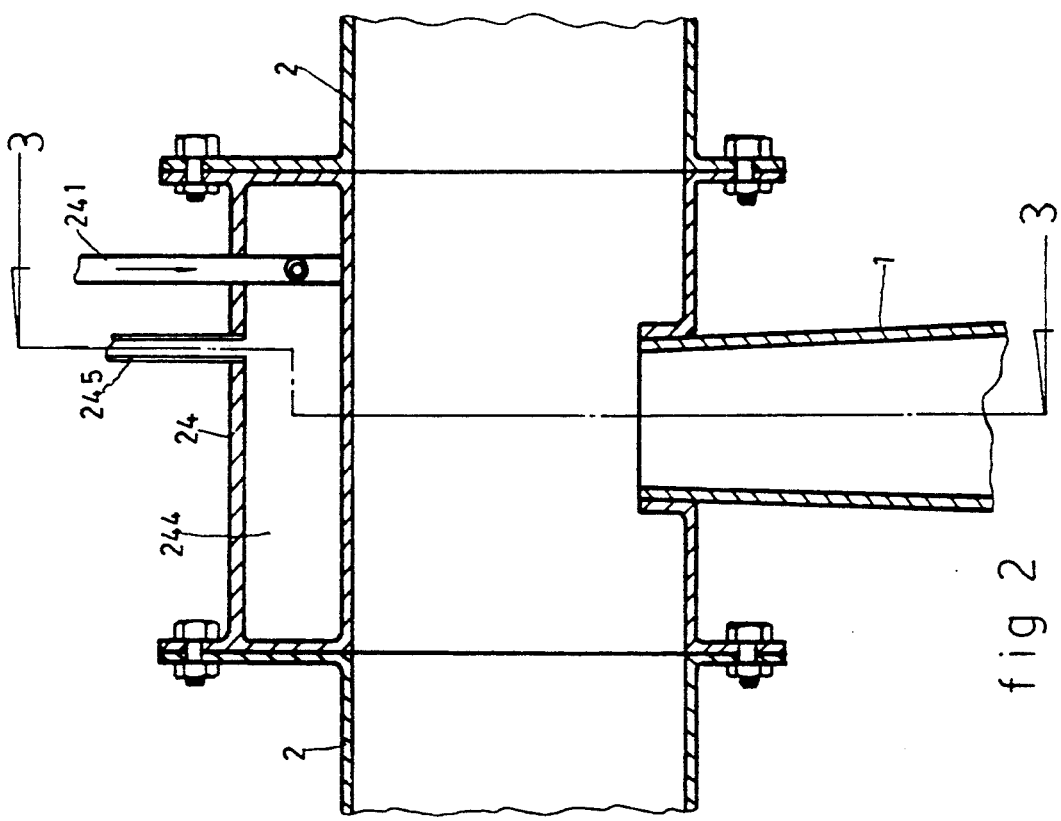
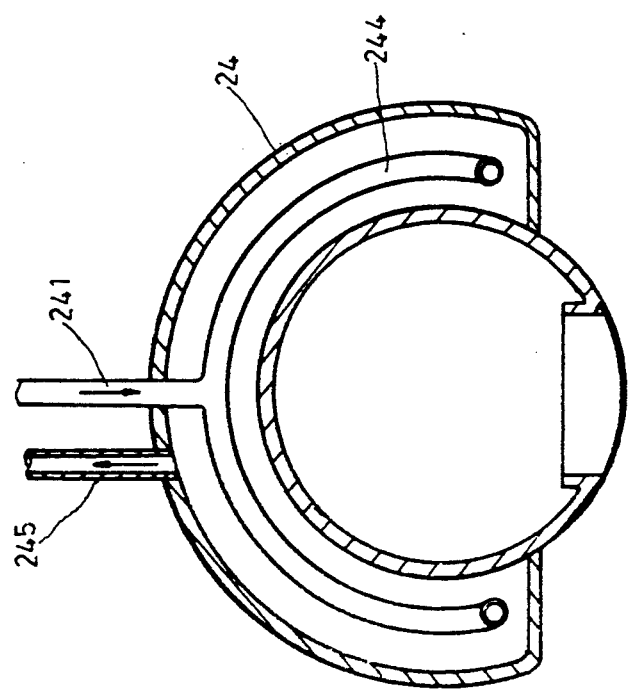
fig 2
fig 3

FILTER SYSTEM FOR SMOKE OR POLLUTED AIR

The present invention relates to a system for cleaning the smoke or the polluted air and more precisely, the present invention relates to a filter system in which a device is provided to clean the smoke or the dirty air with mists of working fluid and devices are provided to clean the waste liquid generated by means of filtering bags and sedimentation troughs, respectively.

BACKGROUND OF THE INVENTION

Up to the present, there are many filter devices have already been developed to clean the smoke or the dirty air. But, functions offered by these filter devices are quite different from each other. One of these devices is applying water sprayers to carry out the cleaning job. General speaking, the cleaning device with water sprayers is much simpler for installation and very practical for use.

The inventors, Sung-Chuan Mai et al., have endeavoured in the field of air anti-pollution for many years, and have create many devices to treat the waste gas. For instance, U.S. Pat. No. 5,074,007, CLEANER FOR EXHAUST PIPE, granted on Dec. 24, 1991 is invented by them to clean the dust in the exhaust pipe of a combustion engine. Now, they improve the art concerning water spraying and the waste water treatment to create a system for cleaning the smoke or the polluted air under the condition of no further contamination occuring.

SUMMARY OF THE INVENTION

Basically, part of the present invention has applied the art of the water spraying, but a completely different arrangement is involved to intensify the filtering effect. A special arranged long duct with a plurality of power sprayers are provided to guide the smoke or the polluted air toward specific directions to mix with mists of the working fluid. The waste liquid flowing down from the duct may pass through a plurality of disposable porous bags so as to retain dirty substances in the waste liquid. The liquid out of the plurality of disposable porous bags may be led into a plurality of sedimentation troughs for further treatment, and the cleaned water obtained may be recycled as part of the working fluid. The pure water or other suitable liquids may be used as the working fluid depending on the ingredients containing in the smoke or the polluted air. For instance, the soap water and the detergent water may be used as the working fluid to clean the polluted air or the smoke containing oily or grease substances, the lime water and the refrigerated water may be used as the working fluid to clean the polluted air or the smoke containing offensive odors and poisonous substances. The filter system according to the present invention provides many different types of smoke filter devices for different specific needs. It is noted that one of the filter devices is especially suitable for the smoke out of the burning tower in the petroleum refining plant, and another one of the filter devices is especially suitable for the smoke out of a steamship. In short, the filter system according to the invention is adaptable for the respective smoke or the respective dirty air generated from a variety of fields in industry.

In addition, a coarse ash collecting device is provided in the filter system according to the present invention to collect bigger particle ashes or dusts before the smoke or the polluted air entering the filter device for the smoke or the polluted air so as to lessen the burden of the filter device and to enhance the cleaning effect. Also, a compact type of water treatment device is provided in the filter system according to the present invention to treat the waste liquid which is less dirty so as to simplify the water filtering process.

An object of the present invention is to provide a filter system in which each filter device for the smoke or the polluted air has a specific long duct with a plurality of power sprayers to clean dirty substance containing in the smoke or the polluted air.

Another object of the invention is to provide a filter system in which a bag filter device has a plurality of flexible, porous bags to clean the waste liquid flowing down from the respective filter device for the smoke or the polluted air efficiently.

Still another object of the invention is to provide a filter system in which a water treatment device has a plurality of sedimentation troughs to treat the liquid out of the bag filter device.

Another object of the invention is to provide a filter system in which a coarse ash collecting device is used to collect bigger particle ashes or dusts highly containing in the smoke or the polluted air before entering the respective filter device for the smoke or the polluted air.

Another object of the invention is to provide a filter system in which a compact type of water treatment device is offered to clean the less turbid waste liquid.

BRIEF DESCRIPTION OF THE DRAWINGS

The present invention will be further illustrated, by way of example, with reference to the accompanying drawings, in which;

FIG. 2 is a cross-sectional view of a short duct section located at the lowest duct section of FIG. 1 showing the positions of a cooling water chamber, a water intake pipe, and a water outlet pipe;

FIG. 3 is a cross-sectional view along line 3-3 in the FIG. 2 showing a discharge branch pipe extending along the cooling water chamber on the short duct section;

DETAILED DESCRIPTION OF THE PREFERRED EMBODIMENT

Figure 1:
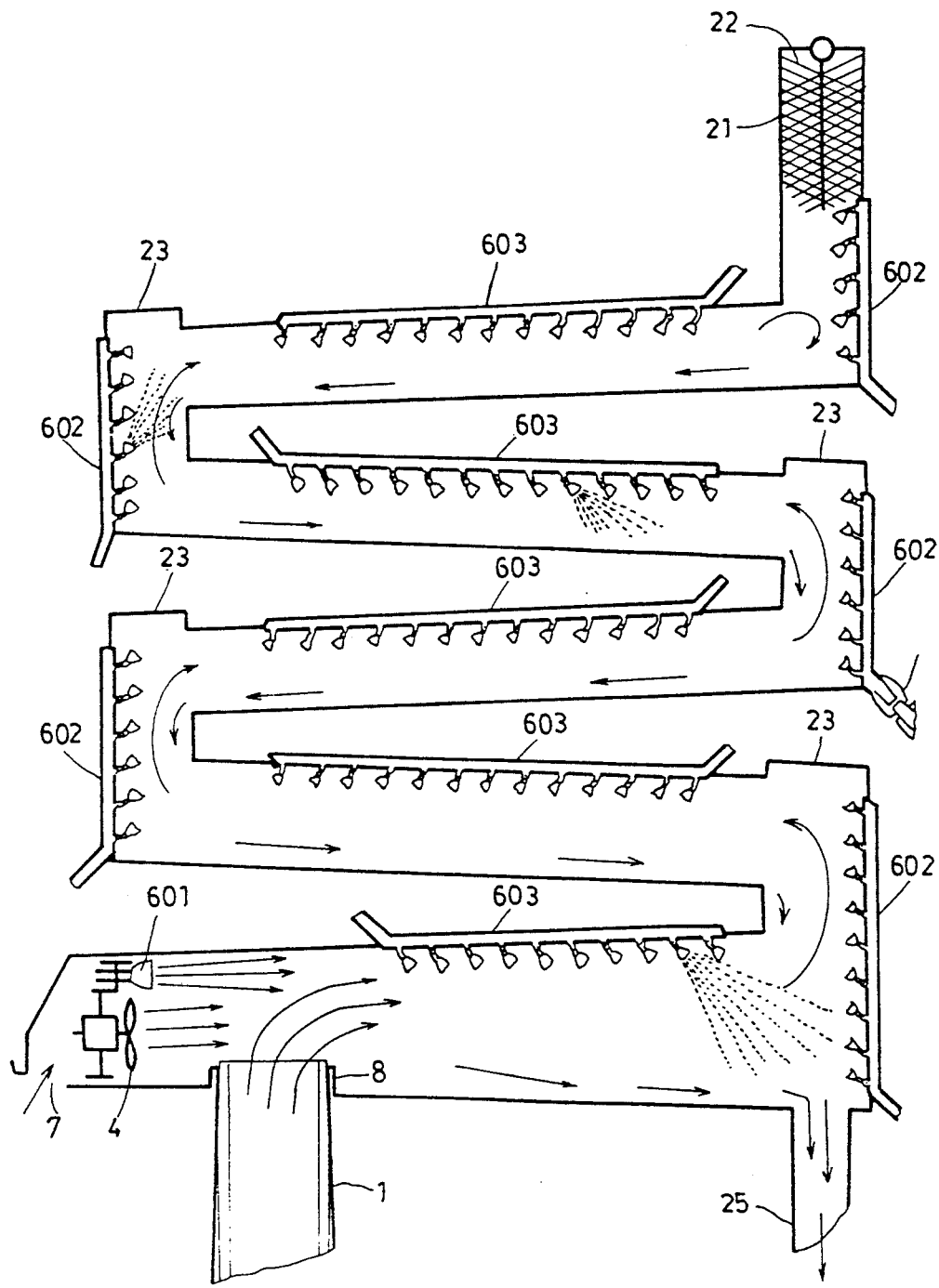
FIG. 1 is a cross-sectional view of a sinuous type smoke filter in the filter system according to the present invention.

Referring to FIG. 1, therein illustrated is a sinuous type smoke filter according to the present invention, which generally comprises a sinuous smoke duct 2, a plurality of power sprayers sets 601, 602, 603, a power blowing fan 4, and a filter element 22. The sinuous smoke duct 2 further consists of a plurality of smoke duct sections connected by a plurality of end connectors 23 at the respective bends. However, an end of the lowest smoke duct section is provided with a draft intake opening 7 and there is no end connector 23 fastened there. A waste gas intake port 8 is disposed near the draft intake opening 7. The highest smoke duct section has an end provided with an air outlet 21 and there is no end connector 23 fastened there either. Therefore, the waste gas can be smoothly guided into the waste gas intake port 8 and delivered out of the sinuous smoke duct 2 through the air outlet 21 thereof. The exhaust pipe 1 of the burner or the furnace is connected to the waste gas intake port 8 so that the waste gas from the burner or the furnace is guided into the sinuous smoke duct 2 for treatment. The power blowing fan 4 provides a strong current of air to force the waste gas of the burner or the furnace to flow upwards along the inside walls of the sinuous smoke duct 2. The first set of power sprayers 601 are disposed at a suitable location near the waste gas intake port 8, and controlled to produce thick mists of the working fluid for cooling and mixing the waste gas. The second set of power sprayers 602 are respectively fastened to the end connectors of the sinuous smoke duct 2 in vertical direction to produce clouds of working fluid for mixing with the waste gas passing by and in delivering it upwards. The third set of power sprayers 603 are fastened to the respective duct sections of the sinuous smoke duct 2 on the top in transverse direction to let the continuously moving flow of waste gas be completely mixed with the working fluid. The spray nozzles of the lower sprayers of the third set of power sprayers 603 are respectively arranged in the forward direction so that the respective mist of working fluid is moved with the flowing direction of the waste gas while the spray nozzles of the upper sprayers of the third set of the power sprayers 603 are respectively arranged in the backward direction against the flowing direction of the waste gas, and therefore the waste liquid can be guided to flow out of the sinuous smoke pipe duct 2 through a bottom drain pipe 25. The spray nozzles of the topmost sprayer of the second set of power sprayers 602 adjacent to the air outlet 21 of the sinuous smoke pipe duct 2 are arranged backwards and controlled to spray the working fluid against the movement of the waste gas. The filter element 22 is disposed in the air outlet 21 to remove the water from the continuous current of air passing through. The total length of the sinuous smoke duct 2 is determined according to the concentration of the waste gas discharged from the burner or the furnace, namely, the total length of the sinuous smoke duct 2 is directly proportional to the concentration of the waste gas to be treated. The working fluid used for the power sprayers 601, 602, 603 can be a clean water, a refrigerated water, a soap water, a lime liquid, or any other suitable liquid detergents depending on ingredients containing in the waste gas.

Figure 4:
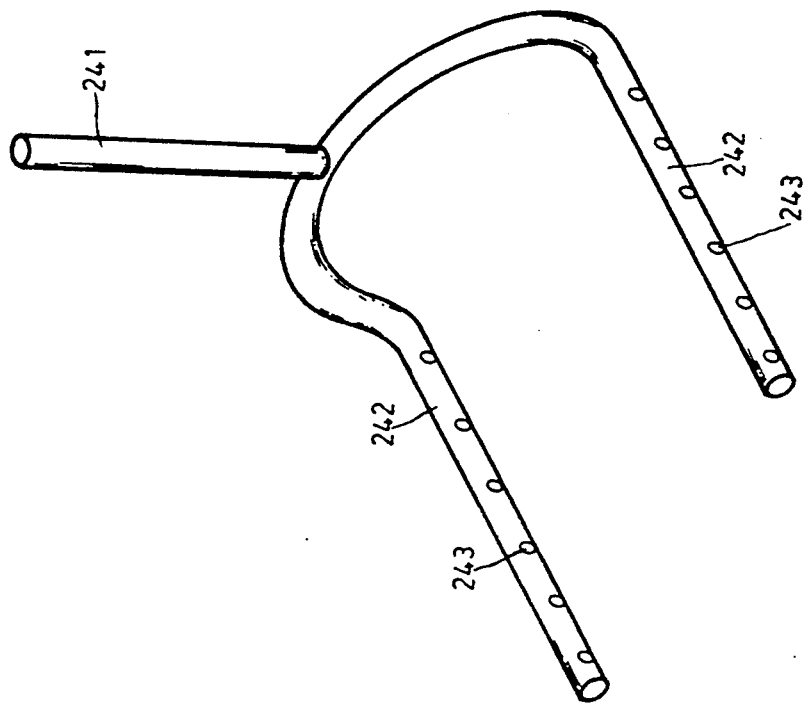
FIG. 4 is a perspective view of the water intake pipe with the discharge branch pipe shown in FIG. 2 and FIG. 3.

Referring to FIG. 2, therein illustrated is a detachable short duct section 24 fastened to the lowest duct section in the sinuous smoke duct 2 of FIG. 1 around the waste gas intake port 8. Because the waste gas from the exhaust pipe 1 of the burner or the furnace is very hot, the short duct section 24 may be made of a heat-resisting material. Referring to FIGS. 3 and 4 and accompanying with FIG. 2, a cooling water chamber 244 is disposed on the short duct section 24 and has a space enclosed along a greater part of the outer surface of the short duct section 24. A flow of cooling water is guided into the cooling water chamber 244 through a water intake pipe 241, and then flows out of the chamber 244 through a water outlet pipe 245. A discharge branch pipe 242 is connecting with the water intake pipe 241 and extends along the cross section of the chamber 24.4. Both ends parts of the discharge branch pipe 242 are extending a distance along the transverse direction in the chamber 244 respectively. Both end parts are provided with a plurality of drain holes and enclosed end respectively. The water intake pipe 241 and the water outlet pipe 245 are respectively secured to the short duct section 24. The cooling water may be circulating through the water intake pipe 241, the cooling water chamber 244 and the water outlet pipe 245 by means of the gravity of the water itself or by means of the operation of a water pump.

Figure 5:
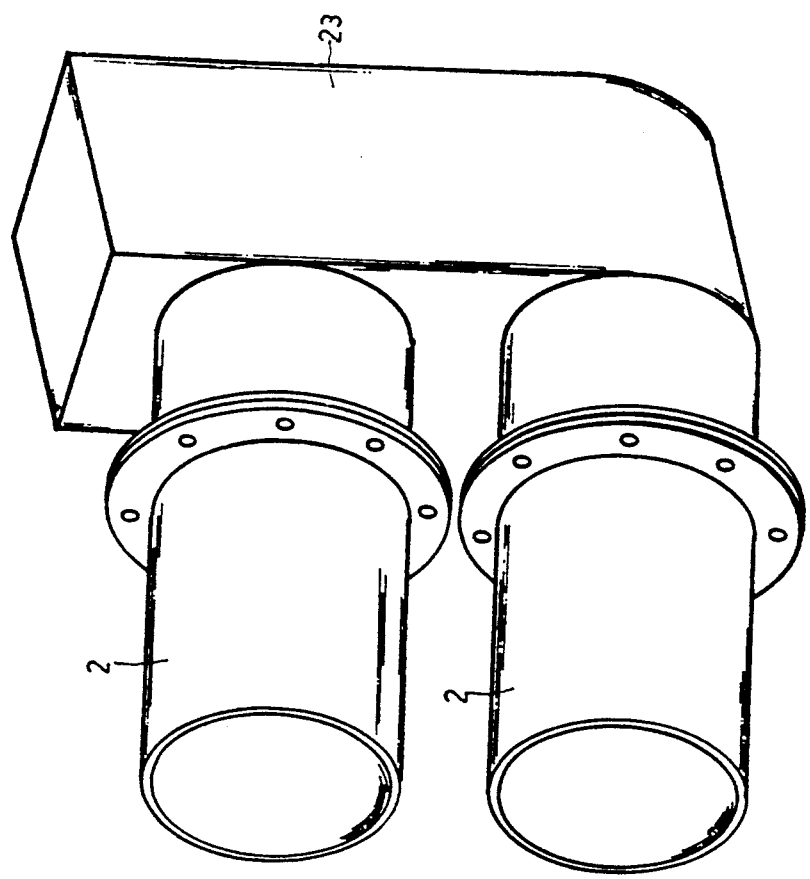
FIG. 5 is a perspective view of an end connector connecting with two fragmentary duct sections of the sinuous duct in the sinuous type smoke filter of FIG. 1.

Referring to FIG. 5, therein illustrated is the arrangement of an end connector 23 in connecting two adjacent smoke duct sections of the sinuous smoke duct 2. An end connector 23 is composed of two flanged portions extending out of an elongated casing at right angles to receive two adjacent smoke duct sections of the sinuous smoke duct 2. Each connecting end of the smoke duct sections of the sinuous smoke duct 2 is also flanged, and therefore the flange on either end of each smoke duct section is respectively fastened to the flange on either flanged portions of the respective end connector 23 by screws and a respective gasket ring. The smoke duct sections of the sinuous smoke duct 2 may be respective made from a pipe having a round-shaped cross section, a square-shaped cross section, a rectangular-shaped cross section, or any other suitable cross sections.

Figure 8:
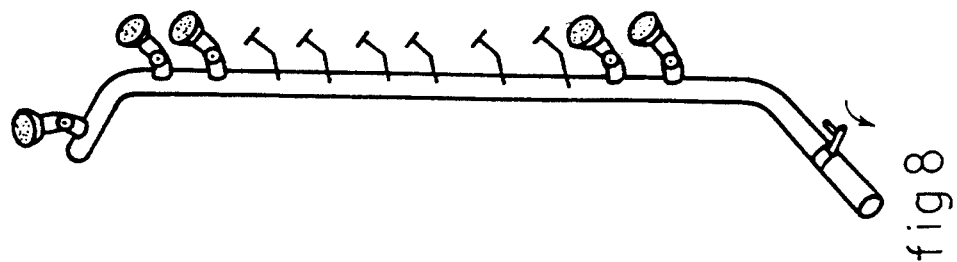
FIG. 6 to FIG. 8 are perspective views of different types of power sprayers devices provided in the sinuous type smoke filter shown in FIG. 1.
Figure 7:
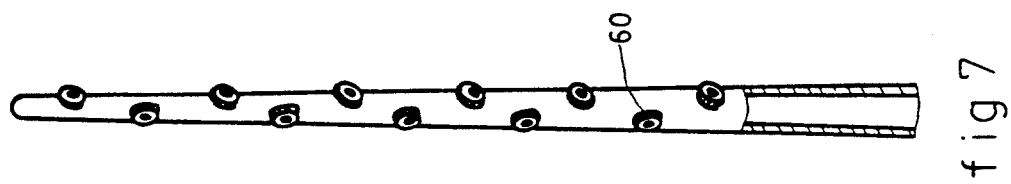
Figure 6:
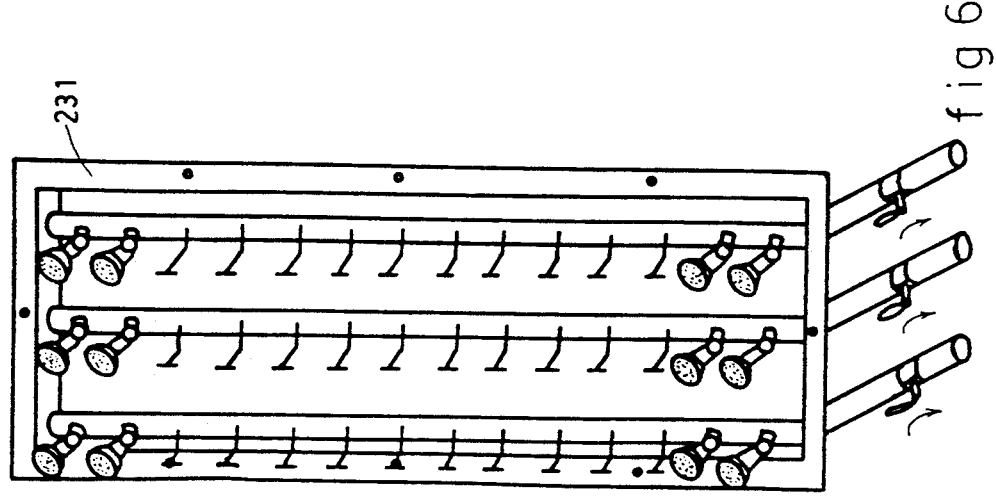
Figure 10:
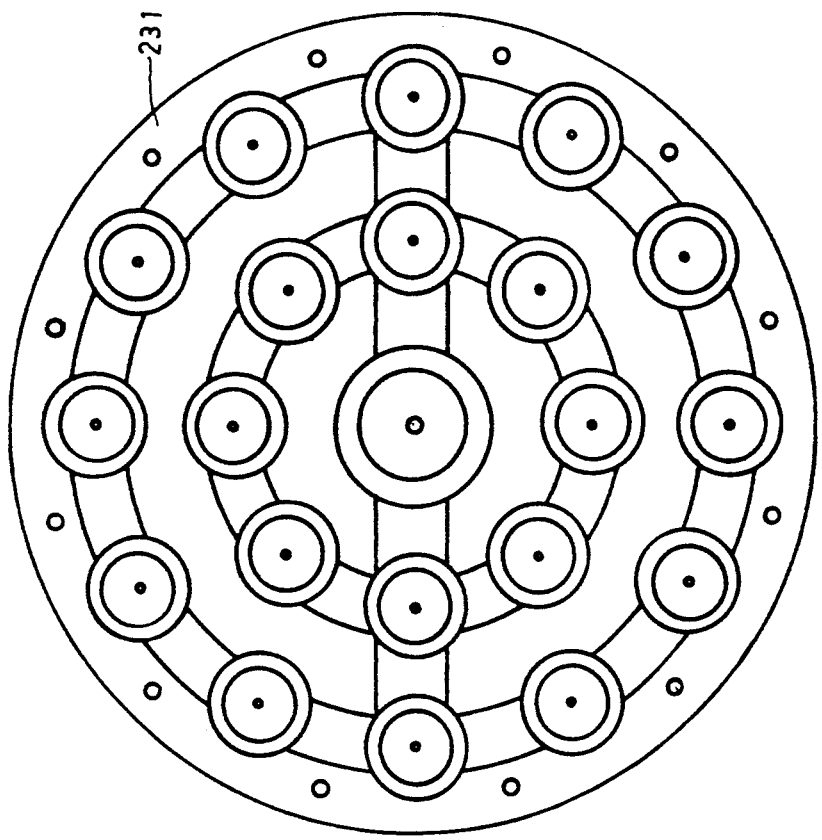
FIG. 9 to FIG. 12 are plane views of other types of power sprayers devices provided in the sinuous type smoke filter shown in FIG. 1.
Figure 9:
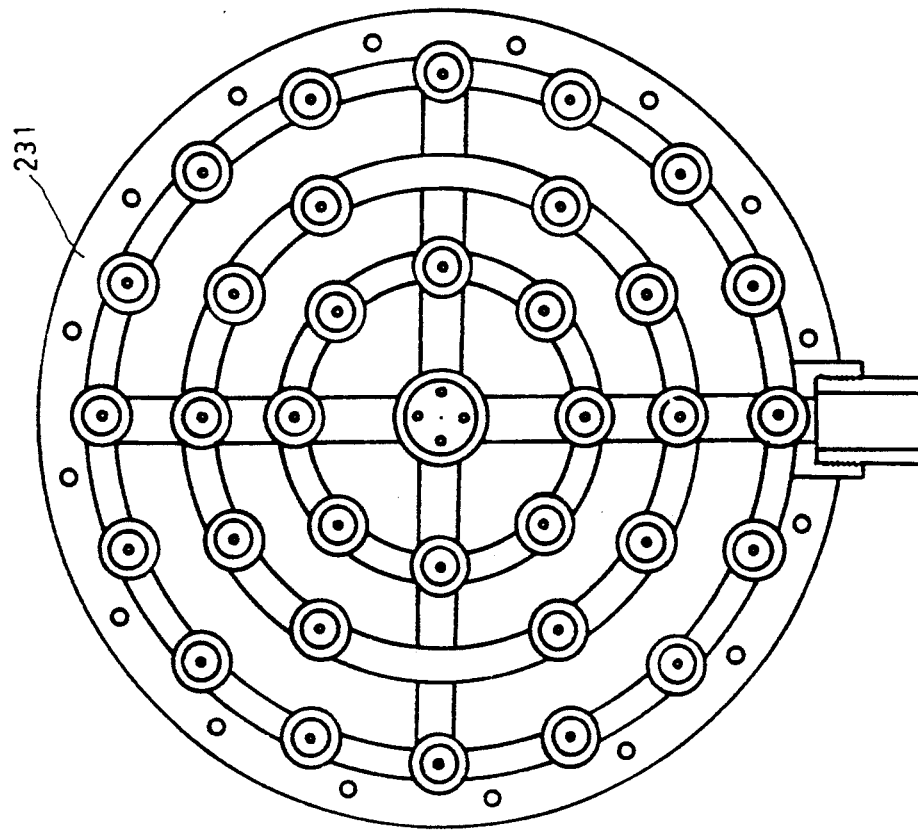
Figure 12:
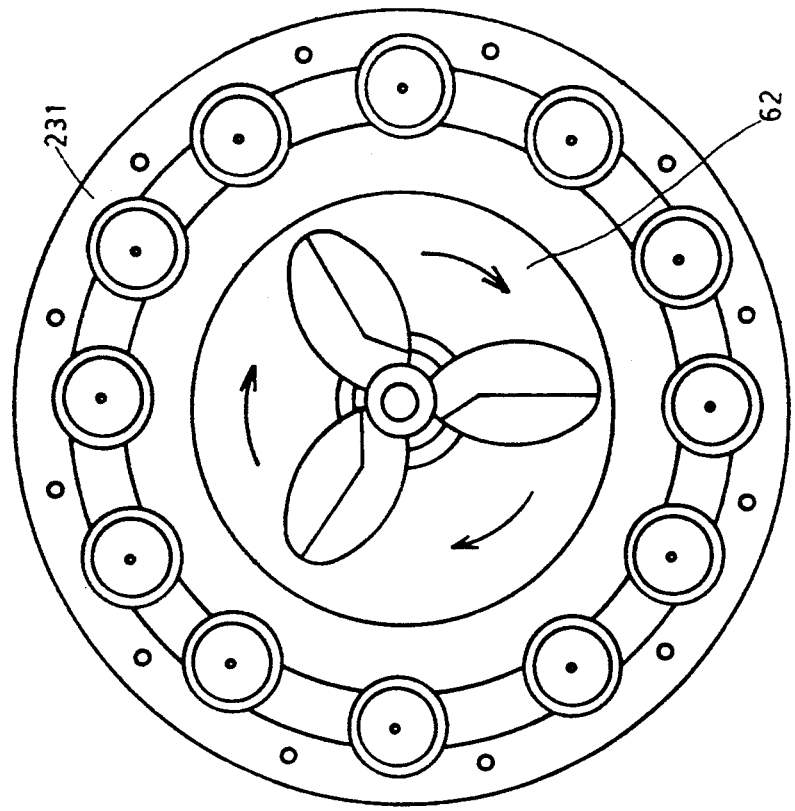
Figure 11:
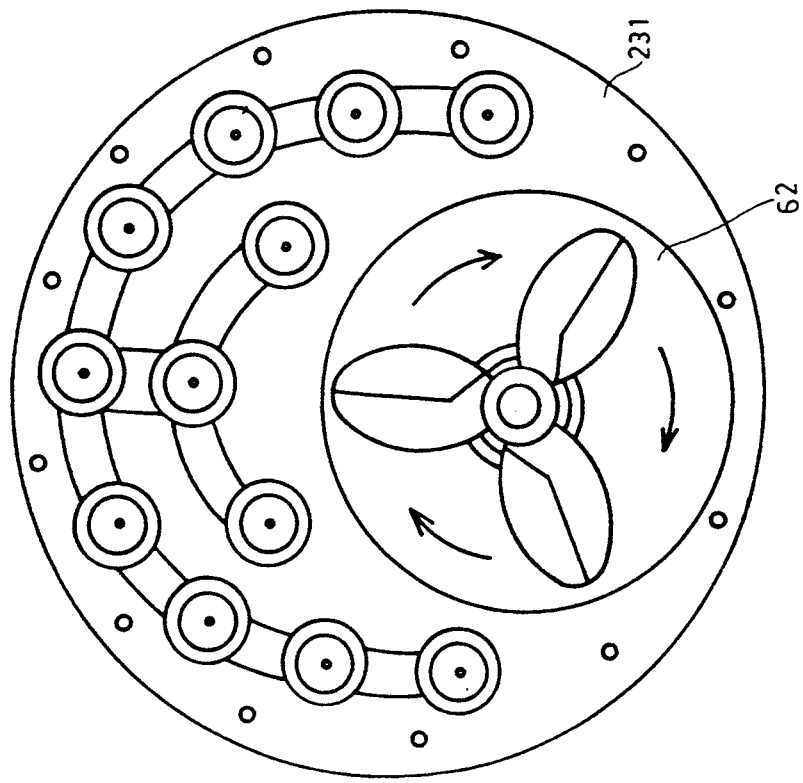

Referring to FIGS. 6 through 12, therein illustrated are various alternate forms of the power sprayers set 602, 603. In FIG. 6, each of the sprayers sets 602,603 is provided with a plurality of spray nozzles connected to a plurality of parallel water pipes in a rectangular frame, which is fastened to either end connector 23 or either smoke duct section of the sinuous smoke duct 2 by screws and gaskets. This structure of sprayers set is suitable for use in the smoke duct sections having each a rectangular or square cross section or a flat surface for mounting the rectangular frame of the respective sprayer set. In FIGS. 7 and 8, the sprayers sets 602,603 are each composed of a single water pipe 60 having a plurality of spray nozzles respectively arranged in different directions. In FIGS. 9 and 10, the sprayers sets 602,603 are each arranged in a round frame having a plurality of bolt holes around the border at equal interval for fastening to the sinuous smoke duct 2 by screws and gaskets. In the sprayers set of FIG. 9, the water flows from the center toward the periphery. In the sprayers set of FIG. 10, the liquid is sprayed at one side toward all directions. In FIGS. 11 and 12, the sprayers sets are equipped with blowing fans 62 for moving the sprayed liquid and the waste gas passing by. These sprayers sets are most suitable for mounting on the end connectors 23. Furthermore, the rectangular frame of the sprayers set in FIG. 6 may be made in an arched shape for fastening to the smoke duct sections having each a round-shaped wall.

Figure 13:
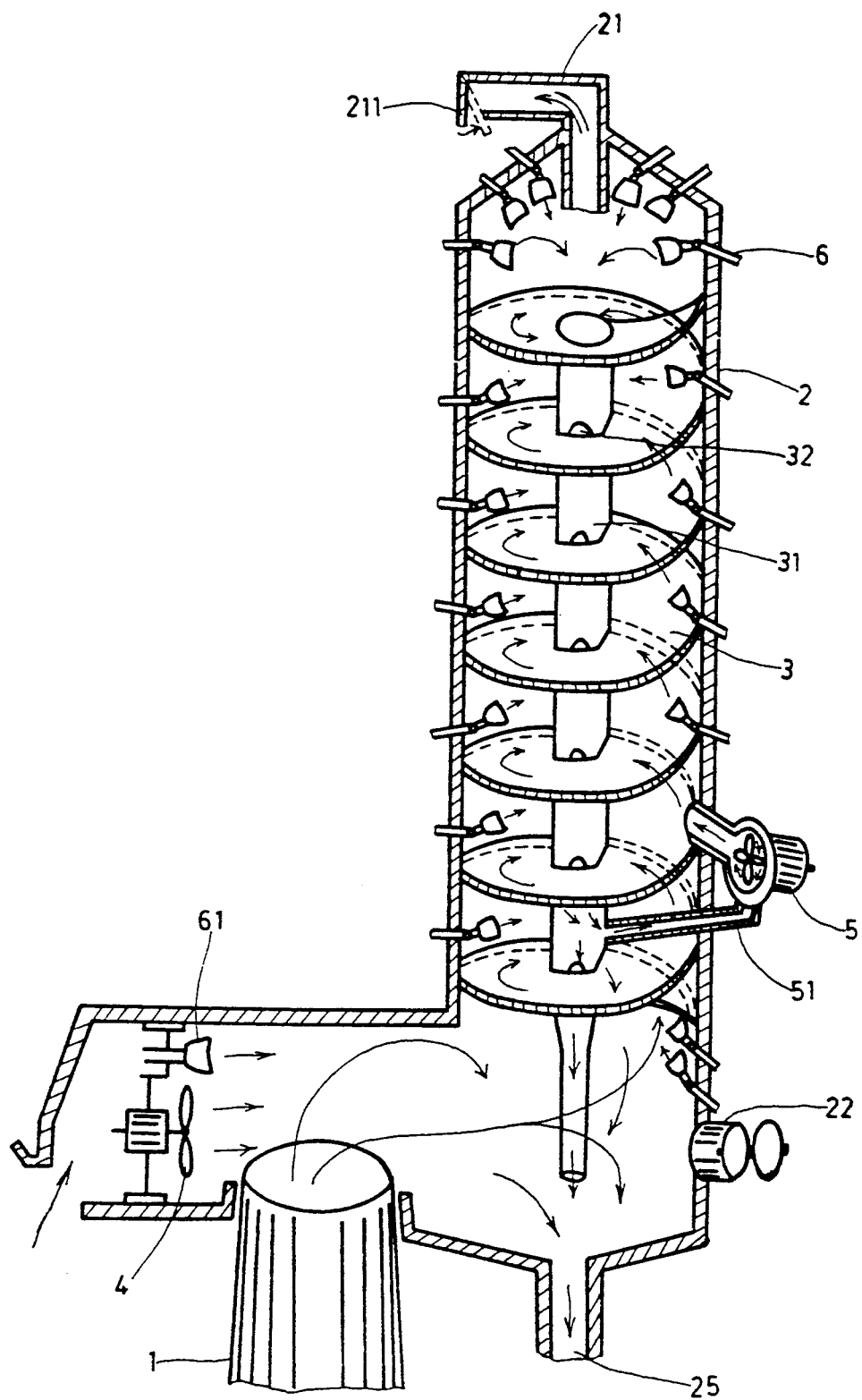
FIG. 13 is a cross-sectional view of a spiral type smoke filter in the filter system according to the present invention.

Referring to FIG. 13, therein illustrated is an alternate form of the smoke filter of the present invention. In this embodiment, the smoke duct 2 is made in a cylindrical form having a spiral guide 3 on the inside along its length. The periphery of the spiral guide 3 is fastened to the inside wall of the smoke duct 2. The spiral guide 3 has a center pipe 31 along its length. The center pipe 31 has a plurality of water holes 32 at suitable locations, through which the waste liquid is guided into the center pipe 31 by the spiral guide 3. The flow of waste gas from the exhaust pipe 1 of the burner or the furnace is blown by the power blowing fan 4 and the power sprayer 61 to move upwards along the spiral guide 3. At the same time, the sprayers 6 spray mists of working fluid mix with the moving flow of waste gas, causing the dirty particles in the moving flow of waste gas to be carried by the working fluid into the center pipe 31. The waste liquid which is guided into the center pipe 31 flows out of the center pipe 31 and drained out of the smoke duct 2 through the bottom drain pipe 25, and then treated through a bag filter device (shown in FIG. 38). The well-treated gas is discharged out of the smoke duct 2 through the top air outlet 21. The air outlet 21 in this embodiment is made from an angle tube having a dust guard 211 on the end, which stops the rain, the water or the outside dust from entering the smoke duct 2. A water pump 5 is fastened to the smoke duct 2 at a lower level having a water piping 51 connected to the center pipe 31. When necessary, the water pump 5 may be controlled to pump the waste liquid the center pipe 31 back to the spiral guide 3 toward the moving direction of the waste gas passing through the spiral guide 3. A man hole 22 is made on the smoke duct 2 adjacent to the bottom edge thereof on one side, through which a repair man can enter the smoke duct to process a repair or maintenance work. The water cooling chamber as illustrated in FIGS. 2, 3 and 4 may be employed in this embodiment around the exhaust pipe 1 of the burner or the furnace cooling the hot waste gas.

Figure 14:
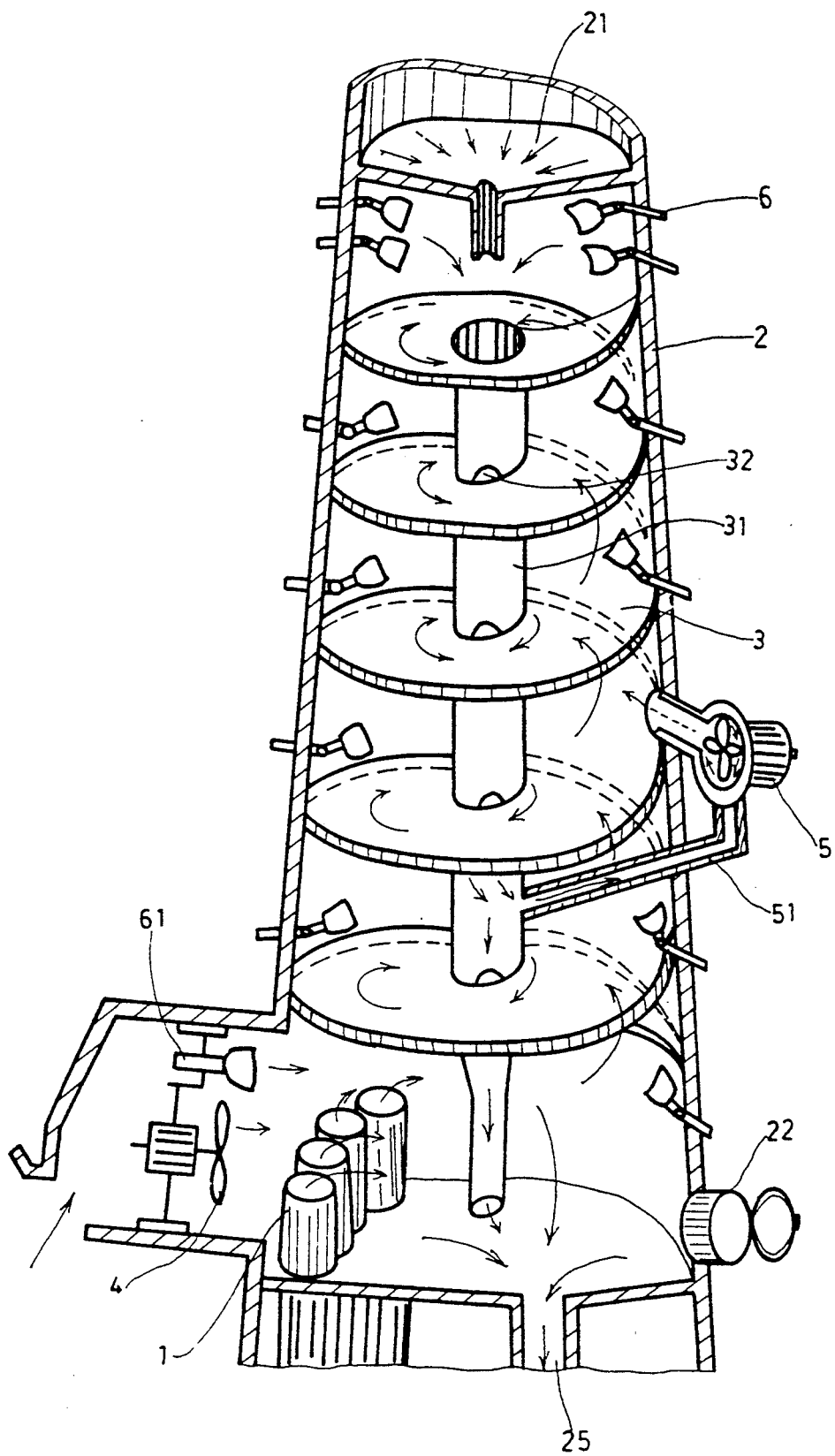
FIG. 14 is a cross-sectional view of still another embodiment of the smoke filter similar to FIG. 13 and suitable for applying on a steamship.

Referring to FIG. 14, therein illustrated is another alternate form of the smoke filter of the present invention. This alternate form is similar to the embodiment of FIG. 13. In this embodiment, the smoke duct 2 has a bottom board 24, which has a plurality of holes through which a plurality of exhaust pipes 1 are respectively inserted into the smoke duct 2. The smoke duct 2 is formed in a tapered, cylindrical shape gradually reducing upwards, having a round or egg-shaped cross section at any height. The smoke duct 2 has an upper wall 21 blocked adjacent to the top edge thereof. The upper wall 21 is curved inwards, having the lowest center portion provided with a downward tube 211 for allowing the clean air out of the smoke duct 2 and for gathering and guiding the rain water to the center pipe 31. Although the downward tube 211 is relatively smaller, the clean air can still be expelled out of the smoke duct 2 by means of the operation of the power blowing fans 61. This embodiment is suitable for treating the smoke from the smoke stacks of a steamship or for use in a burner having multiple exhaust pipes.

Figure 15:
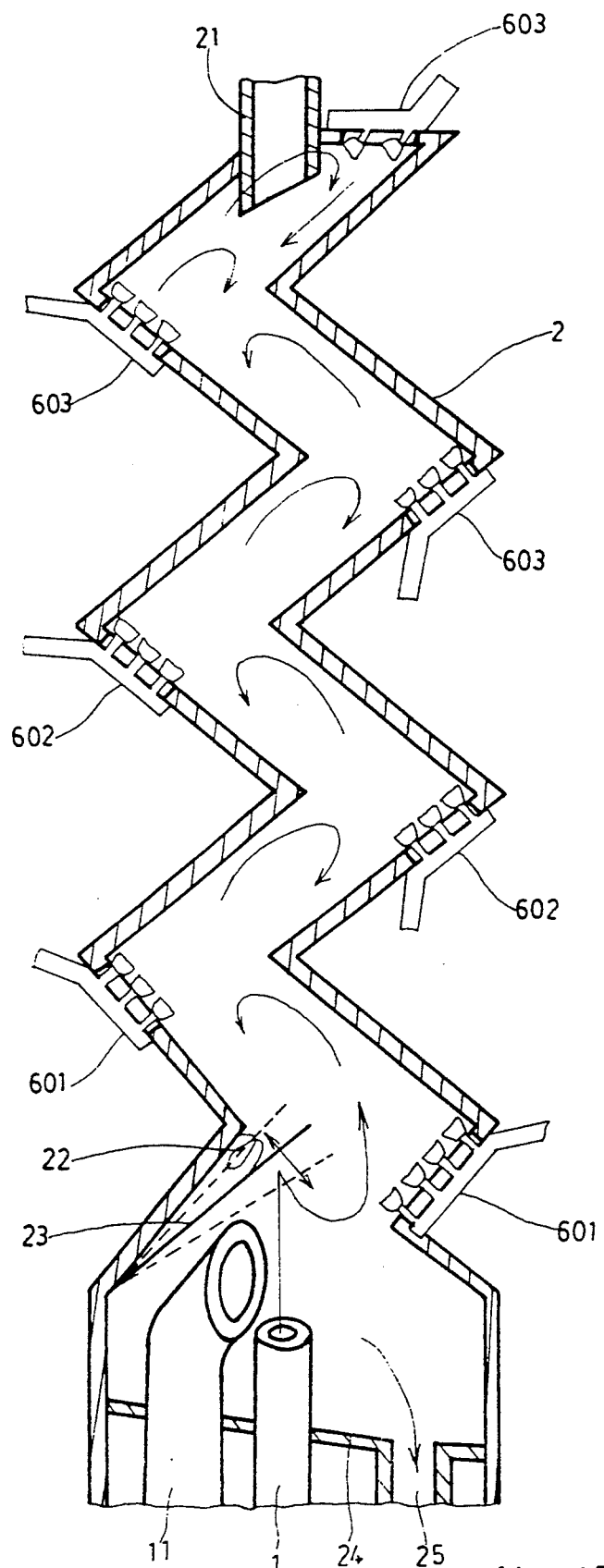
FIG. 15 is a cross-sectional view of another embodiment of the smoke filter for cleaning the high pressure smoke.

Referring to FIG. 15, therein illustrated is still another alternate form of the smoke filter of the present invention. In this embodiment, the smoke duct 2 is made in the shape of a zigzag line. The smoke duct 2 has a wider bottom. The bottom board 24 has holes (not shown) through which a high-pressure waste gas exhaust pipe 1 and a regular waste gas exhaust pipe 11 are respectively inserted into the smoke duct 2. The drain pipe 25 is formed on the bottom board 24 at one side for discharging waste water out of the smoke duct 2. The roof of the smoke duct 2 is made in a flat structure having an upright air outlet 21 for discharging the clean air. The power sprayers 601, 602, 603 are respectively fastened at the turns of the smoke duct 2 at two opposite sides and the flat roof thereof. There is provided a baffle board 23 obliquely disposed inside the sinuous smoke duct 2 above exhaust pipes 1 and 11. The buffle board 23 has a lower side fixed to the inside wall of the smoke duct 2 and an upper side freely suspended. There is also provided a high-strength spring 22 having one end fixed to the smoke duct 2 and the other end fixed to the back of the baffle board 23. When a high-pressure waste gas is blown out of the high-pressure exhaust pipe 1 into the smoke pipe duct 2, it is damped by the baffle board 23. Because the working fluid sprayed by the sprayers 601, 602, 603 may contain lime or refrigerated water, the offensive odors and poisonous substances will be carried away from the high-pressure waste gas as it is mixed with the working fluid, and the waste liquid thus obtained will be guided to the bottom board 24 and discharged out of the sinuous smoke duct 2 through the drain pipe 25. Any regular waste gas which is discharged through the regular waste gas exhaust pipe 11 into the sinuous smoke duct 2 will also be mixed with the mists of the working fluid sprayed by the sprayers 601,602,603, and therefore the particles in the waste gas will be carried away. Because some chemical factories may have to intermittently discharge high-pressure, poisonous gas, the power sprayers may be automatically controlled by the pressure of the discharged gas to respectively spray a mist of working fluid in mixing with the gas so as to eliminate the offensive odors and carry the dirty particles away from the gas. Regulated pressure switches may be respective used to control the operation of the power sprayers 601,602,603 automatically. For example, the first set of power sprayers 601 are switched on to spray the working fluid as the pressure of the discharged high-pressure waste gas reaches 85% of the predetermined discharge pressure, the second set of high-power sprayers 602 are turned on to spray the working fluid as the pressure of the discharged high-pressure waste gas reaches 90% of the predetermined discharge pressure, the third set of power sprayers 603 are opened to shoot out the working fluid as the pressure of the discharged high-pressure waste gas reaches 95% of the predetermined discharge pressure. As soon as the pressure of the discharged high-pressure waste gas was reduced below 85% of the predetermined discharge pressure, all pressure switches are automatically shut off to stop the operation of the power sprayers. Because the operation of the sprayers is completely controlled by the pressure switches and no operators are needs, it is safe in use. As an alternate method, electronic remote control devices may be used for controlling the operation of the power sprayers according to the pressure of the discharged high-pressure waste gas.

Figure 16:
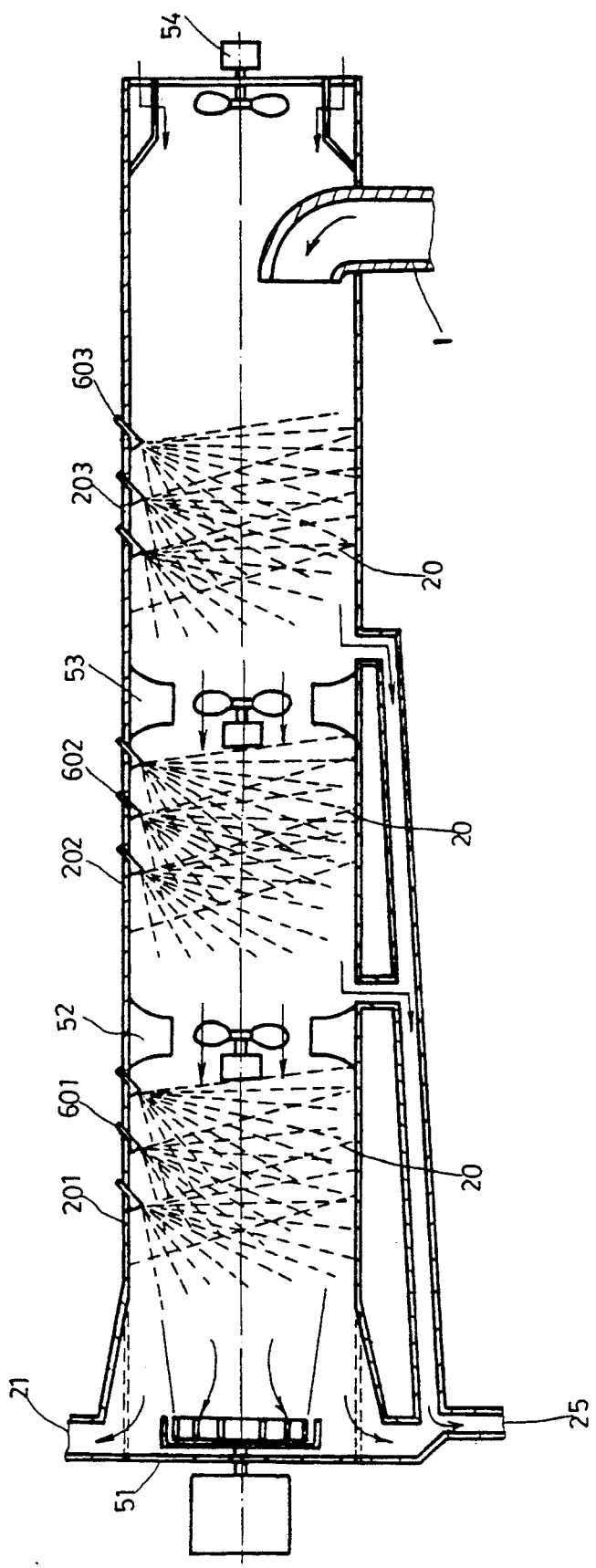
FIG. 16 is a cross-sectional view of another embodiment of the smoke filter.

Referring to FIG. 16, therein illustrated is a horizontal type of smoke filter according to the present invention. The smoke duct 2 consists of three horizontal duct sections, namely, a first duct section 201, a second duct section 202, and a third duct section 203. Of course, the number of duct sections may be increased or reduced according to different requirements. In this smoke filter, an induced-draft fan 51 is installed at one end near the clean air outlet 21, a plurality of flowing fans 52, 53, 54 are respectively in the duct sections 201, 202, 203 for regulating the direction of air current, and a plurality of sprayers 601, 602 and 603 are respectively fastened to the smoke duct sections 201, 202, and 203 to spray mists of working fluid in mixing with the continuous flow of waste gas coming from the exhaust pipe I and passing by. Also, each of duct sections 201, 202, and 203 is provided with a plurality of nets 20 for splashing the working fluid to all directions.

Figure 17:
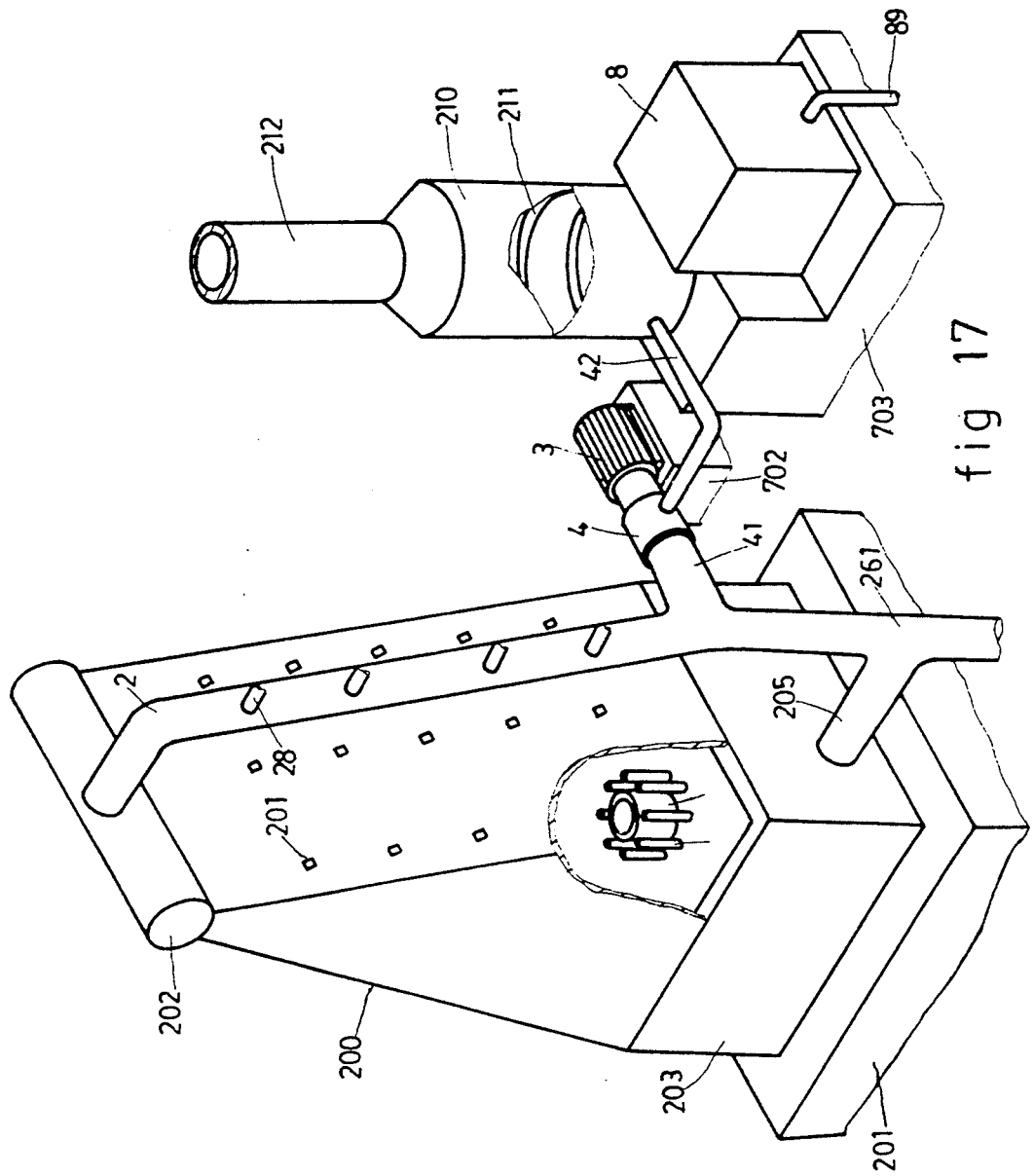
FIG. 17 is a perspective view of another embodiment of the smoke filter suitable for cleaning the smoke out of the burning tower in a petroleum refining plant.
Figure 18:
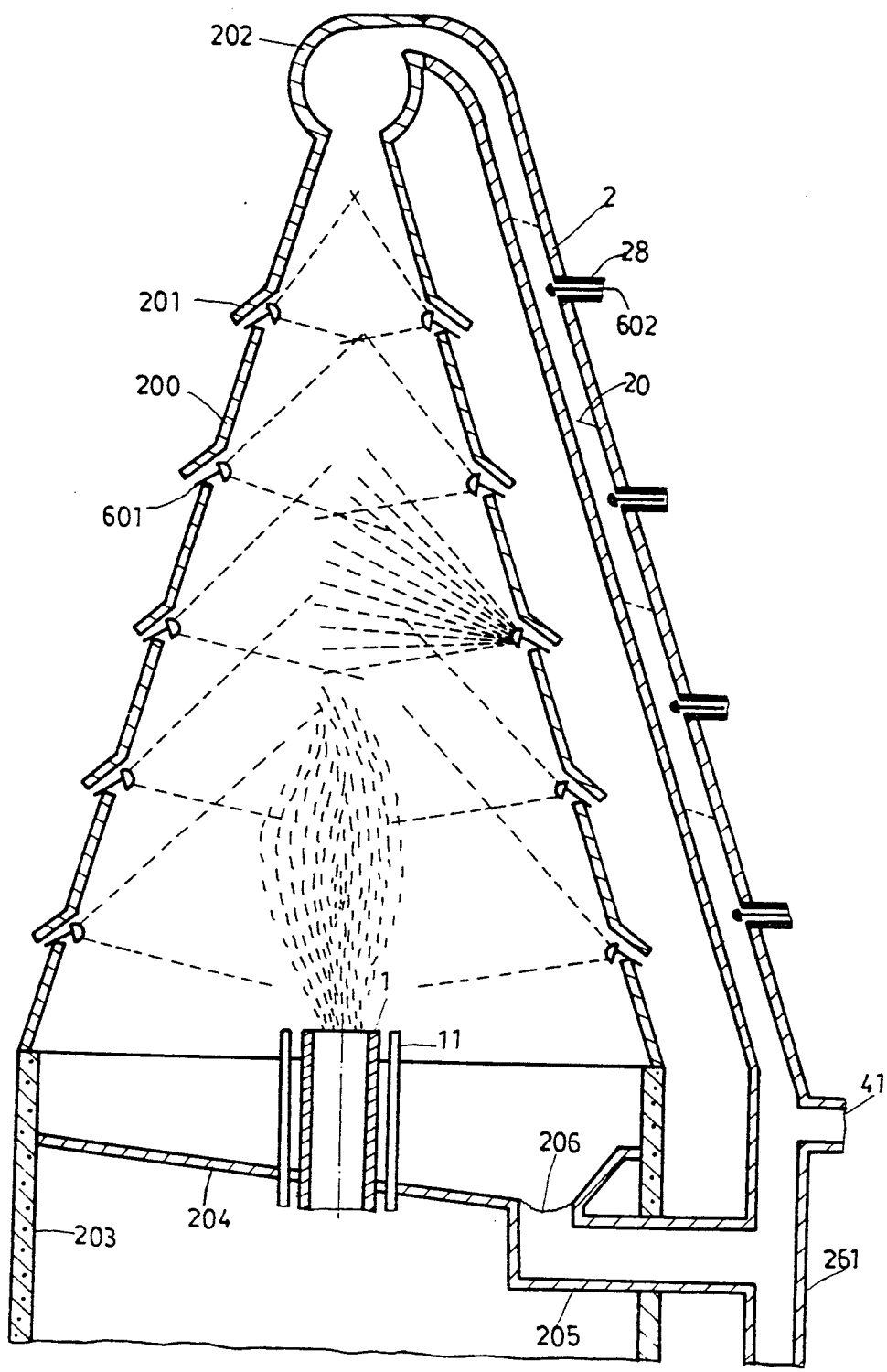
FIG. 18 is the cross-sectional view of the primary filter unit in the smoke filter shown in FIG. 17.
Figure 19:
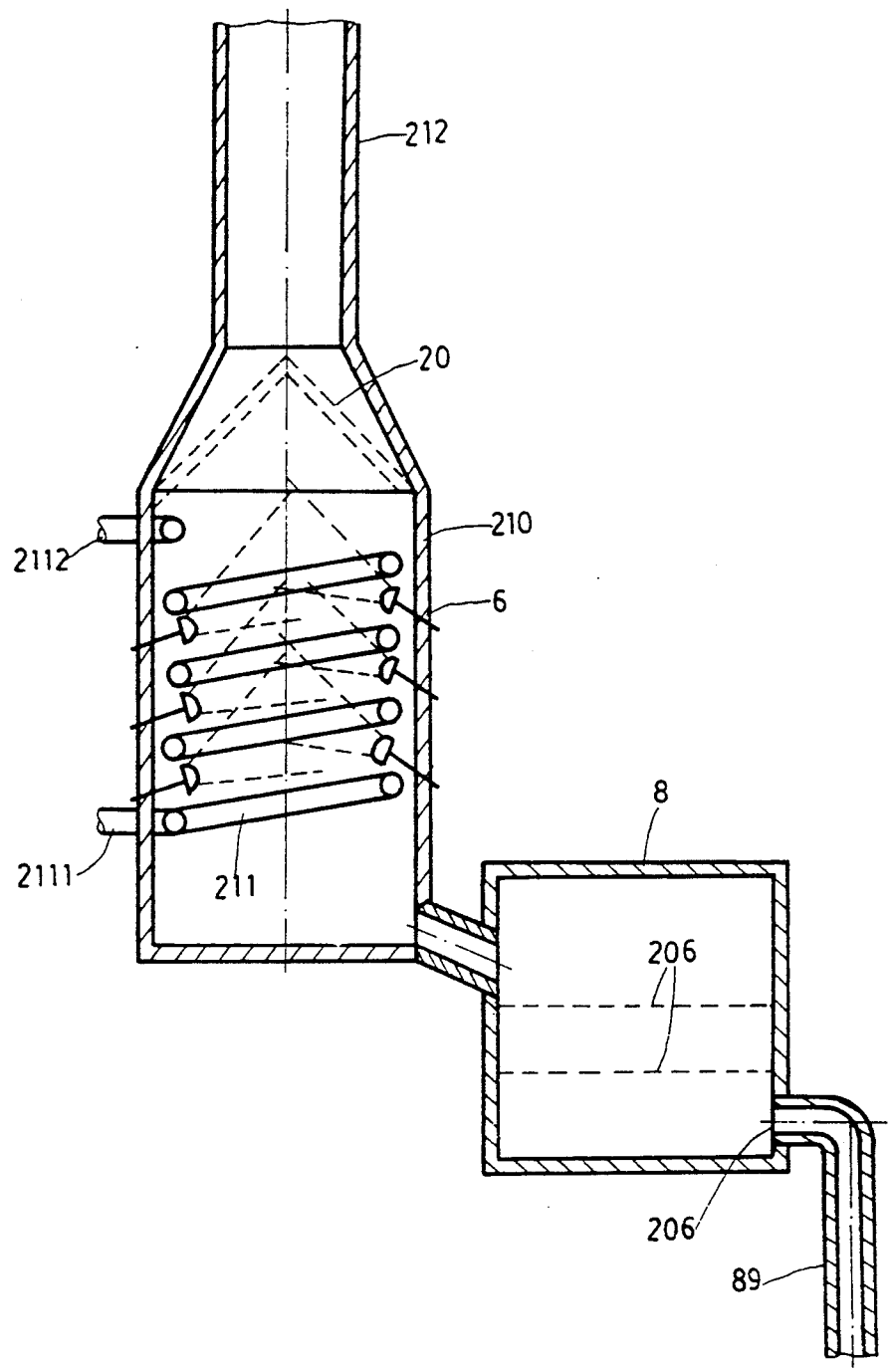
FIG. 19 is the cross-sectional view of the secondary filter unit in the smoke filter shown in FIG. 17.

Referring to FIGS. 17, 18 and 19, therein illustrated is a smoke filter designed for treating the exhaust gas of a burning tower of an oil refinery. Referring to FIG. 17, a plurality of blast pipes 11 are fastened around the top exhaust port 1 of the burning tower to blow exhaust gas upwards. An exhaust gas gathering shell 200 is covered over the top exhaust port 1 of the burning tower. The exhaust gas gathering shell 20 is reducing upwards like a roof, having a plurality of sprayer installation holes 201 spaced on two opposite sides thereof. The topmost end of the exhaust gas gathering shell 20 is formed into a horizontal cylinder 202. The broad bottom of the exhaust gas gathering shell 20 is formed into a waste liquid collecting chamber 203. A smoke duct 2 is extended downwards from the horizontal cylinder 202 and terminated into a drain pipe 261. A plurality of sprayer installation holes 28 are arranged on the smoke duct 2. A discharge pipe 205 is connected between the waste liquid collecting chamber 203 and the drain pipe 261 for guiding waste liquid out of the exhaust gas gathering shell 200. The smoke duct 2 has a lower end connected to a vacuum pump 4 through a suction pipe 41. The vacuum pump 4 is driven by a motor 3 to suck exhaust gas from the exhaust gas gathering shell 200 into the smoke duct 2 and to deliver it to a smoke cooling and cleaning 210 through a discharge pipe 42. The discharge pipe 42 is connected to the smoke cooling and cleaning 210 at the bottom. The smoke cooling and cleaning device 210 is made in a substantially cylindrical shape disposed in vertical direction, having an outlet pipe 212 on the top for discharging well-treated smoke. A coil pipe 211 for delivering cold air or refrigerated water is arranged around the inside wall of the smoke cooling and cleaning device 210 for cooling the smoke passing by. The bottom of the smoke cooling and cleaning device 210 is connected to a waste liquid filter tank 8. The waste liquid filter tank 8 has a drain pipe 89 at one side, the liquid out of the filter tank may be treated again in a water treatment device or directly used as a part of the working fluid depending on its purity. The waste liquid collecting chamber 203, the motor 3 and the smoke cooling and cleaning device 210 are respectively supported on a respective base 701, 702 or 703. The smoke duct 2 and the waste liquid collecting chamber 203 function as a primary filter unit; the smoke cooling and cleaning device 210 incorporates with the waste liquid filter tank 8 as a secondary filter unit.

FIG. 18 is a cross section of the primary filter unit in FIG. 17. The total height of the burning tower can be greatly reduced when the smoke filter of the present embodiment is installed. Because the exhaust pipe of the burning tower is enclosed by the exhaust gas gathering shell 200, there is no need to extend the exhaust pipe of the burning tower to a high level. The blast pipes 11 are connected to the piping of an air compressor. By means of the operation of the air compressor, any exhaust gas from the top of the burning tower is delivered to the horizontal cylinder 202 and guided into the smoke duct 2. At the same time, sprayers 601 and 602 on the sprayer installation holes 201,28 are controlled to spray mists of working fluid for mixing with the exhaust gas passing by. A splashing net 20 is respectively disposed in front of each sprayer 602 so that the liquid ejected from each sprayer 602 is respectively splashed to go off in different directions, forming into a mist of working fluid. Inside the waste liquid collecting chamber 203, there is a tilted waste liquid collecting pan 204 and an elongated waste liquid collecting channel 206. The elongated waste liquid collecting channel 206 has an opening in the bottom to connect with the discharge pipe 205, and therefore the waste liquid can be smoothly guided into the discharge pipe 205. The waste liquid collecting chamber 203 may be made of concrete or any suitable material having high compression strength.

FIG. 19 is a cross section of the secondary filter unit in FIG. 17. When a smoke is induced into the smoke cooling and cleaning device 210 by the vacuum pump 4, a flow of cold air or refrigerated water is guided into the coil pipe 211 through an inlet port 2111 for cooling the smoke passing through the smoke cooling and cleaning device 210. The flow of cooling air or refrigerated water will further flows out of the coil pipe 211 through an outlet port 2112. Because the air temperature inside the smoke cooling and cleaning device 210 is greatly reduced, any suspended particles carried in the smoke will not float upwards. By means of the operation of a plurality of sprayers 6 and a plurality of splashing nets 20 in producing mists of working fluid, the suspended particles carried in the smoke are mixed with the mists of working fluid and fall to the bottom inside the smoke cooling and cleaning device 210, and then guided by a delivery pipe 213 to the waste liquid filter tank 8. The waste liquid filter tank 8 uses a wire gauze filter 206 to remove solid substances from the waste liquid passing through. The filtrated liquid is then discharged out of the waste liquid filter tank 8 through the drain pipe 89.

Figure 20:
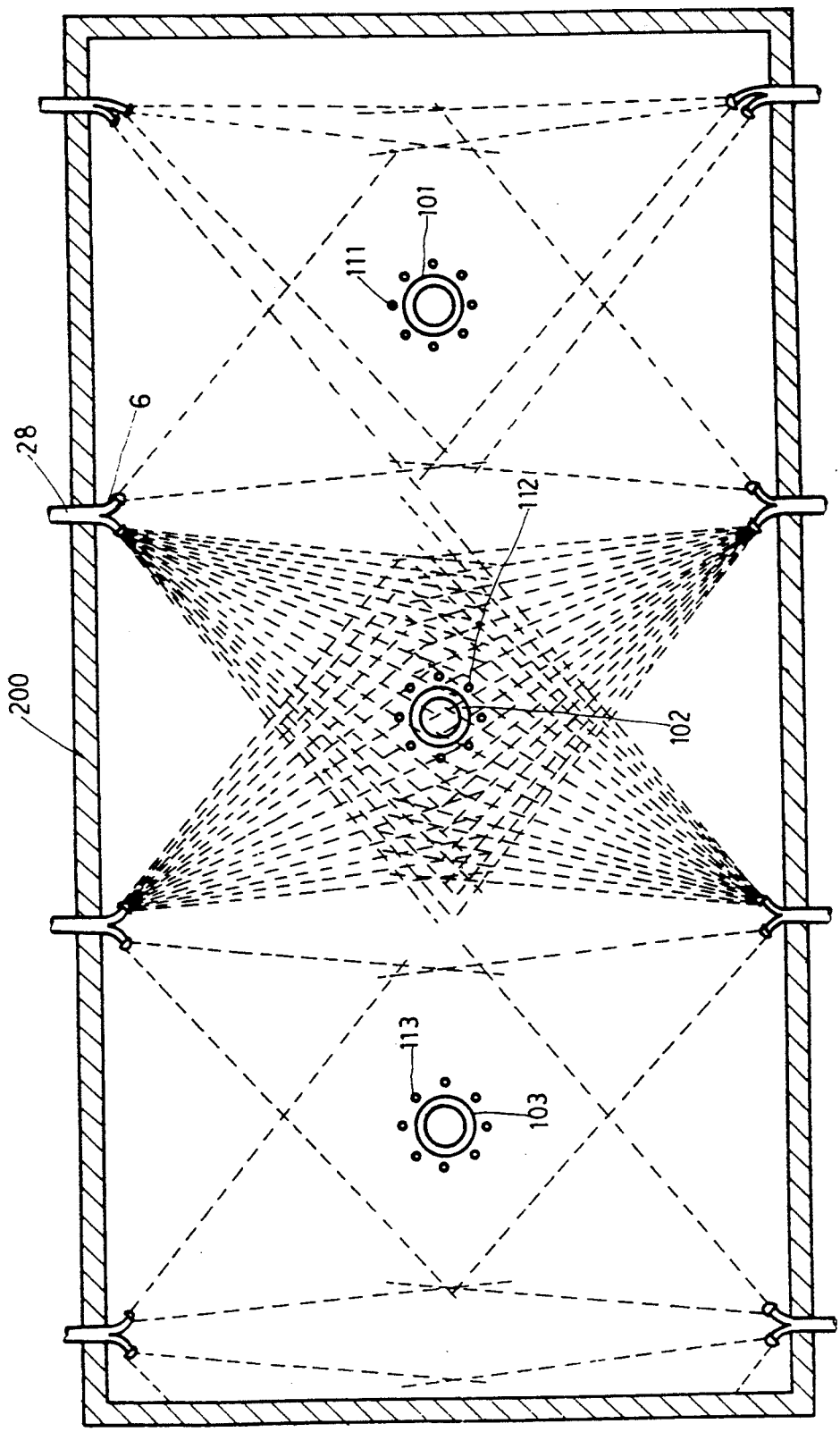
FIG. 20 is the cross-sectional view of a layout in which three exhaust pipes on three burning towers are disposed in the primary filter unit.

The embodiment illustrated in FIGS. 17, 18 and 19 is for use to treat the exhaust gas from a single burning tower. For treating the exhaust gas from a series of burning towers, as illustrated in FIG. 20, a common exhaust gas gathering shell 200 is used to collect the exhaust gas generating from three burning towers 101, 102, 103. A plurality of blast pipes 111,112,113 are respectively arranged around the exhaust pipes 101,102,103. A plurality of smoke ducts 2 are respectively connected between the exhaust gas gathering shell 200 and respective vacuum pumps 4 to induce the exhaust gas to a plurality of smoke cooling and cleaning devices 210 and a plurality of waste liquid filtration chambers 8 respectively. Therefore, for treating the exhaust gas from a plurality of burning towers, it can be done by increasing the scale of the smoke filter.

Figure 21:
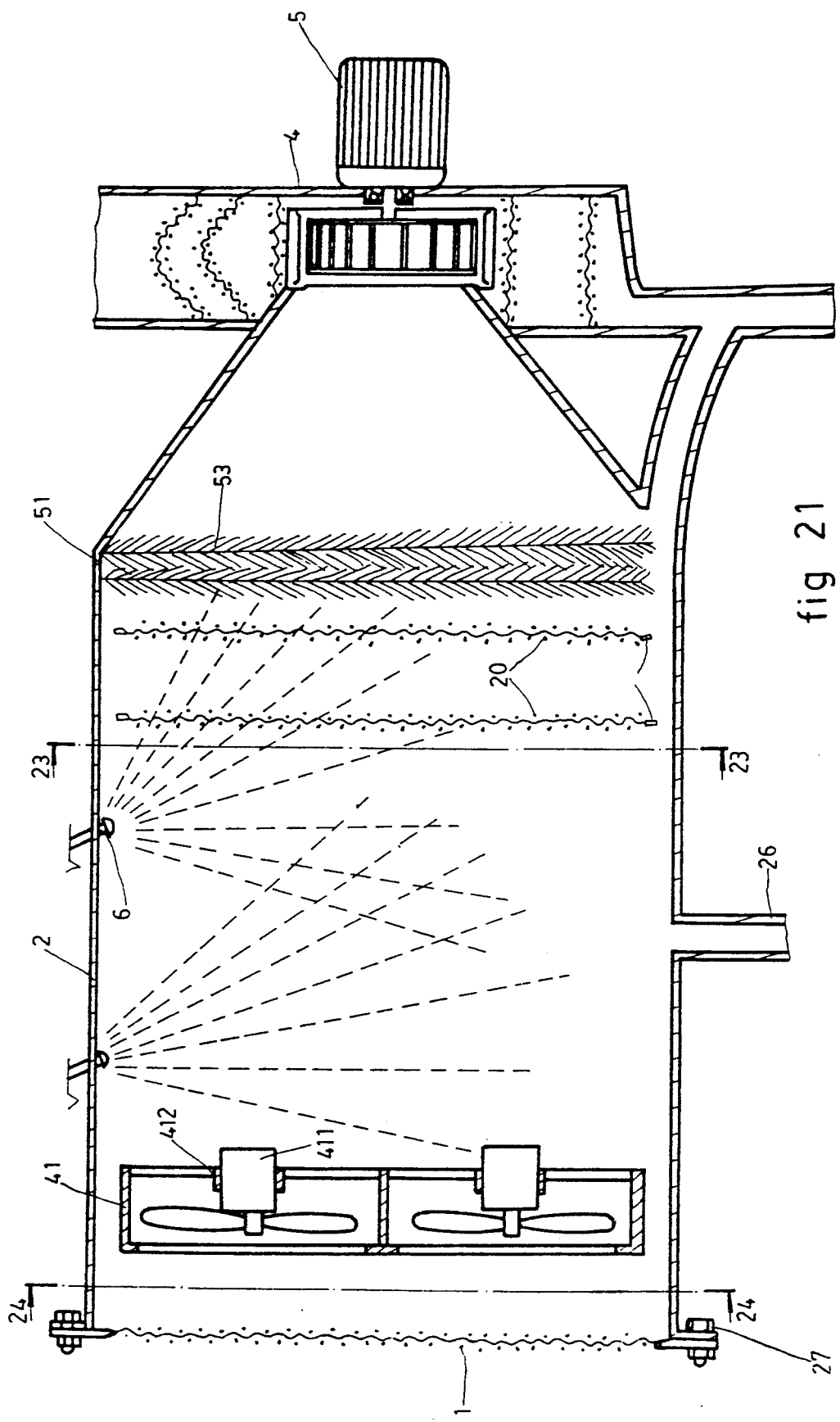
FIG. 21 is the cross sectional view of a polluted air filter in the filter system according to the present invention.

Referring to FIG. 21, therein illustrated is a polluted air filter designed for treating a turbid, dirty air. In addition to sprayers 6 and splashing nets 20, the guide duct 2 is equipped with a suction fan device 41 and a brush type water stopper 5. In this embodiment, the guide duct 2 is relatively shorter, having a front end covered with a net cover 1. The suction fan device 41 sucks a current of outside air into the smoke duct 2 for treatment. The current of air which passes through the splashing nets 20 may contain much moisture. As the current of air passed through the brush type water stopper 5, the contained moisture is removed. An induced-draft fan 4 is rotated by a motor 3 to draw the current of air out of the guide duct 2 through the outlet port thereof. The guide duct 2 has a drain pipe 26 on the bottom for discharging the waste liquid to a compact type waste liquid treatment device (see FIGS. 42 and 43). The polluted air filter and the compact type waste liquid treatment device may be desinged to move from place to place.

Figure 22:
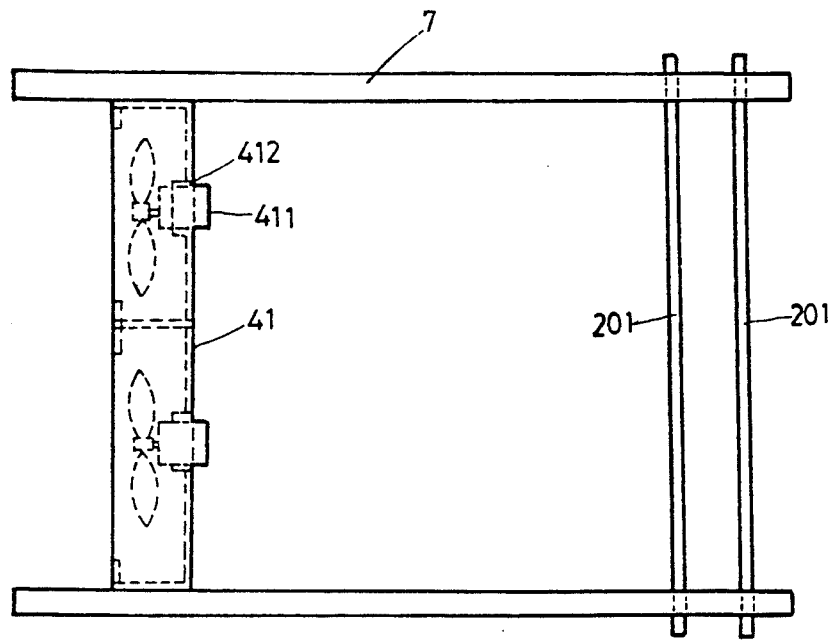
FIG. 22 is a plane view o-L the section fan device with the splashing nets in the filter of FIG. 21 showing the location of the suction fan device and the splashing nets.
Figure 23:
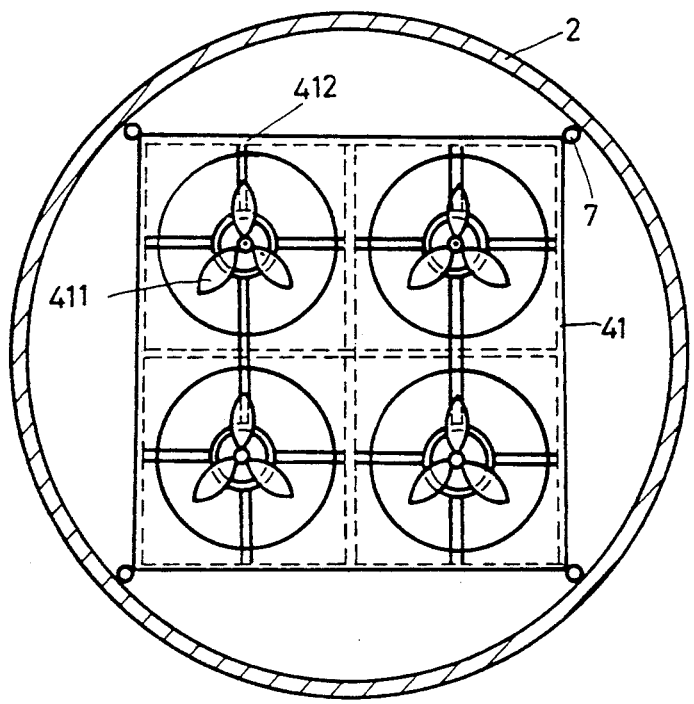
FIG. 23 is a cross sectional view along line 23-23 in FIG. 21 showing the front side of the suction fan device.
Figure 24:
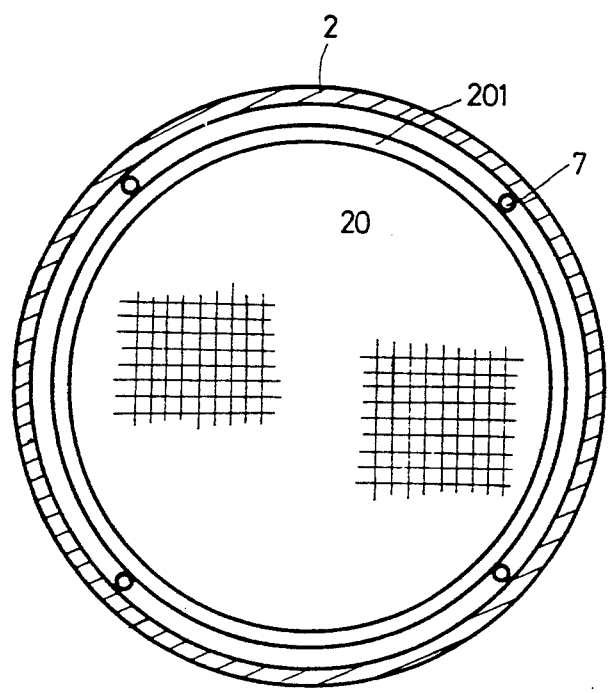
FIG. 24 is a cross sectional view along line BB in FIG. 21 showing the front side of one the splashing nets.

Referring to FIGS. 22, 23 and 24 therein illustrated is the installation of the suction fan device 41 and the splashing nets 20. The suction fan device 41 is provided with a plurality of fan motor assemblies 411 respectively fastened in a rectangular frame by fastening elements 412. The number of fan motor assemblies 411 may be determined according to different requirements. In FIG. 23, there are four sets of fan motor assemblies. The fastening elements 412 are made through ordinary techniques for securing the fan motor assemblies 411 in place. Four elongated connecting rods 7 are respectively fixed to the suction fan device 41 at the four corners thereof to hold the splashing nets 20. The splashing nets 20 are each attached with a mounting ring 201, which is respectively fastened to the connecting rods 7. In FIGS. 21 and 22, there are provided only two splashing nets 20. However, the number of the splashing nets 20 may be increased or reduced according to different situations. The length of the connecting rods 7 is shorter than the distance between the front end opening of the guide duct 2 to the starting point of the gradually reducing section thereof, i.e., the connecting rods 7 are located between the front end opening of the guide duct 2 and the gradually reducing section thereof and disposed in contact with the inside wall of the guide duct 2. By pulling the connecting rods 7 outwards, the suction fan device 41 and the splashing nets 20 are removed out of the guide duct 2 for doing a repair or maintenance work. A plurality of retainer devices may be used to lock the connecting rods 7 inside the guide duct 2 (not shown in FIG. 24).

Figure 25:
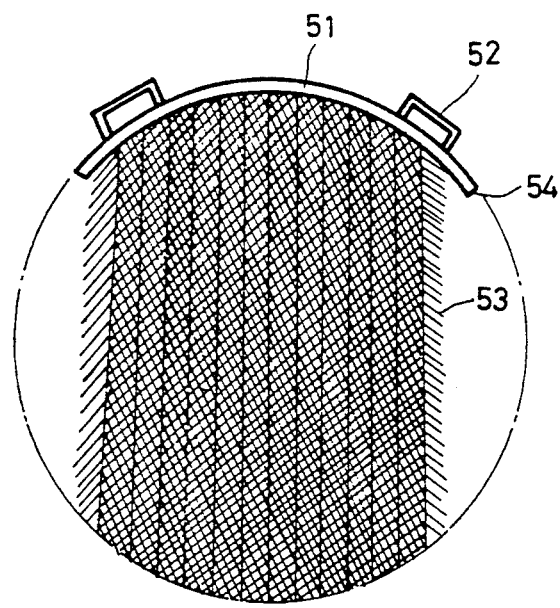
FIG. 25 is a front view of the water stopper shown in FIG. 21.
Figure 26:
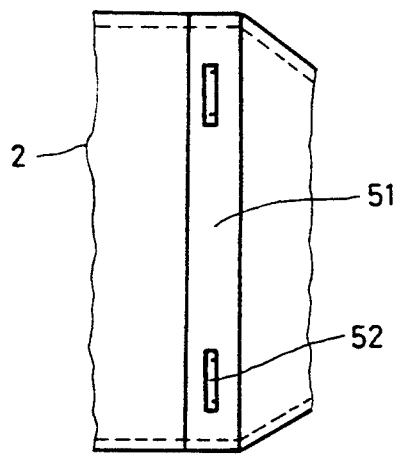
FIG. 26 is atop view of the water stopper of FIG. 25.

Referring to FIGS. 25 and 26, the structure of the brush type water stopper 5 is outlined hereinafter. The brush type water stopper 5 is comprising an arched mounting plate 51 and a plurality of brushes 53. The outer diameter of the mounting plate 51 is approximately equal to the outer diameter of the guide duct 2, and therefore the mounting plate 51 can be mounted on the guide duct 2. The brushes 53 are different in length respectively having an end detachably fixing to the mounting plate 51 and another end freely falling down to the inner wall of the guide duct 2. The mounting plate 51 has handholds 52 at suitable locations, through which it can be conveniently carried with the hands and mounted on the guide duct 2 or removed therefrom.

Figure 27:
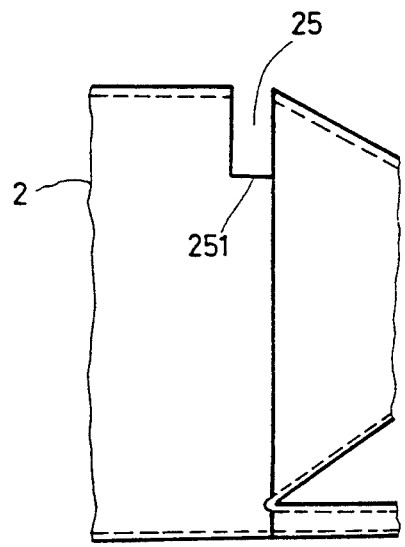
FIG. 27 is a fragmentary side view of FIG. 21 showing the location of the water in the filter.

FIG. 27 is a side view showing the position of the brush type water stopper 5 on the duct 2. The guide duct 2 has a curved opening 25 at the beginning of the gradually reducing section thereof, which receives the brush type water stopper 5. The water stopper 5 has two side ends 54 located on the lateral side 251 of the curved opening 25. The position of the brush type water stopper 5 in the guide duct 2 is also shown in FIG. 26.

Figure 28:
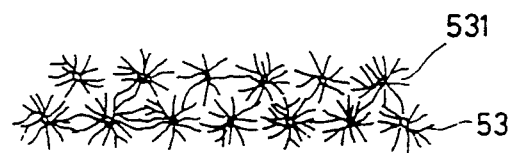
FIG. 28 is an illustration of two stop brushes rows provided in the water stopper shown in FIG. 21.

Referring to FIG. 28, two rows of brushes 531 may be fastened to the mounting plate 51. More rows of brushes can be arranged to remove the water from the clean air passing through. However, the arrangement of the brushes should not hinder the movement of the clean air passing through.

Figure 29:
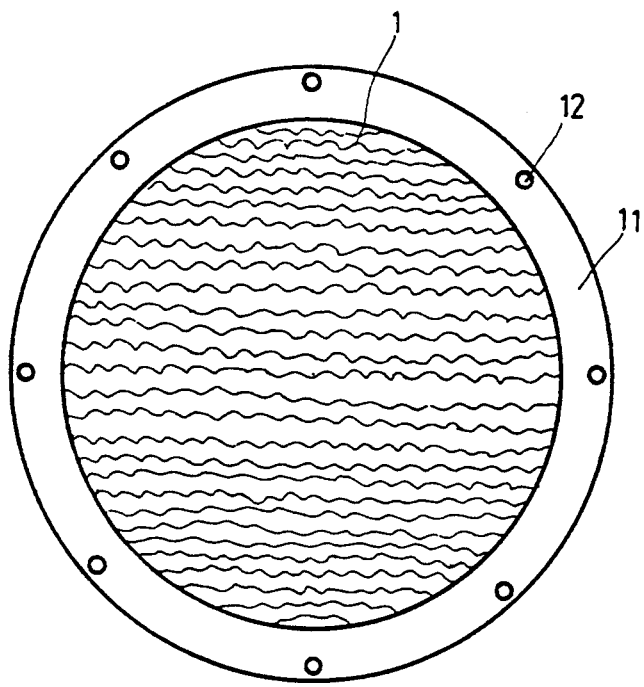
FIG. 29 is a front view of the filter in FIG. 21 showing a fastened net cover.

FIG. 29 is a front view of the net cover 1 which isolates the guide duct 2 from the outside for safety operation. The net cover 1 is held in a mounting ring 11, which has a plurality of small screw holes 12 equidistantly spaced around the periphery thereof respectively connected to the front end edge of the guide duct 2 by screws 27, as shown in FIG. 21.

Figure 30:
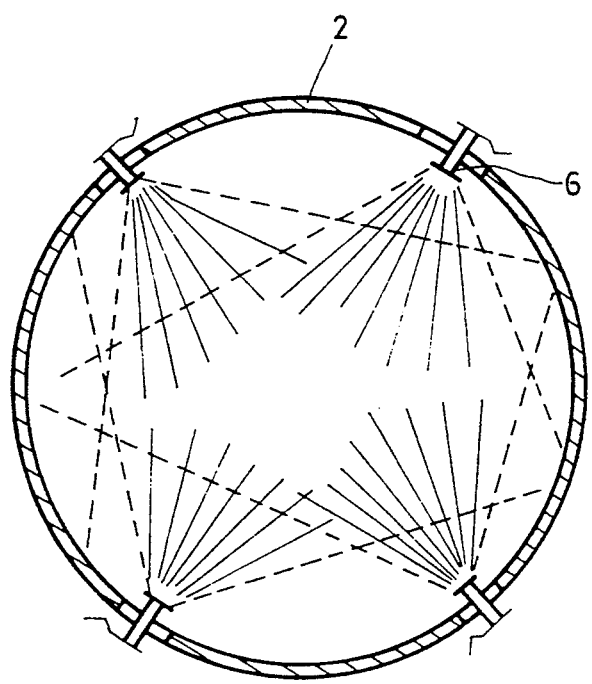
FIG. 30 is a cross sectional view of the filter in FIG. 21 showing the locations of power sprayers.

FIG. 30 illustrates the position of the sprayers 6 on the guide duct 2. The sprayers 6 which are installed in the guide duct 2 around the same cross section should be spaced from one another at equal interval.

Figure 31:
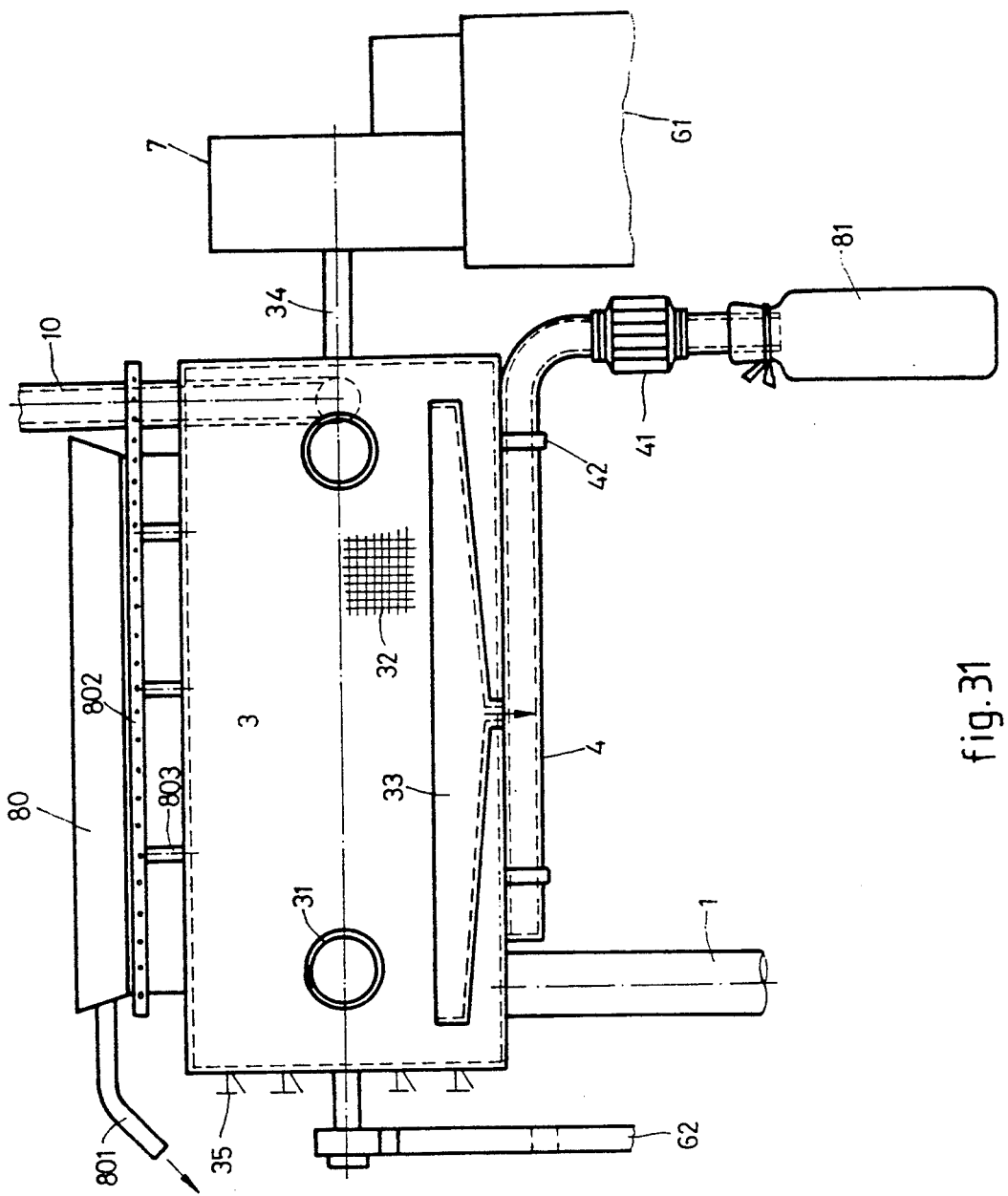
FIG. 31 is a plane view of a coarse ash collector in the filter system according to the present invention.
Figure 32:
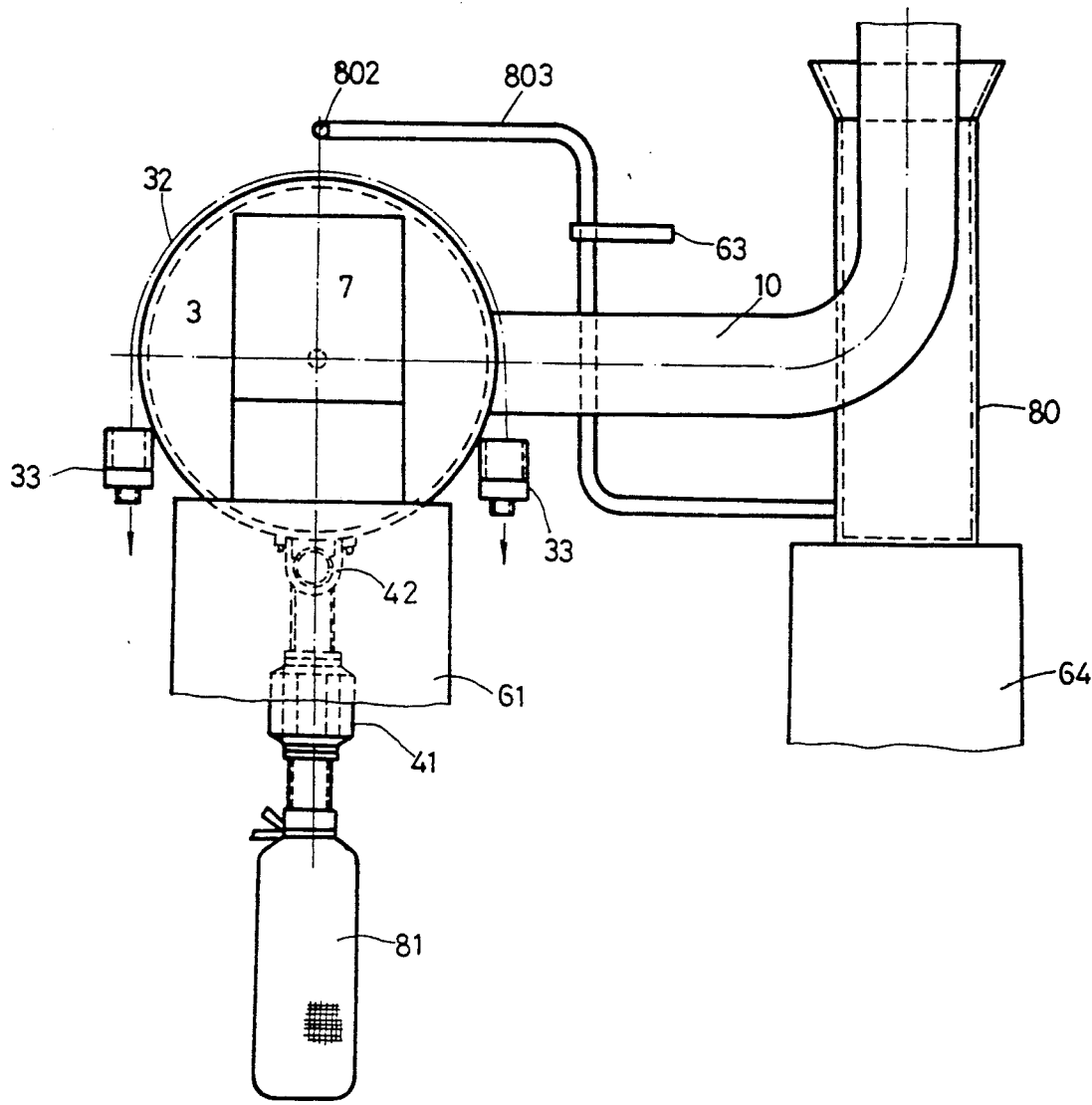
FIG. 32 is a side view of FIG. 31.
Figure 33:
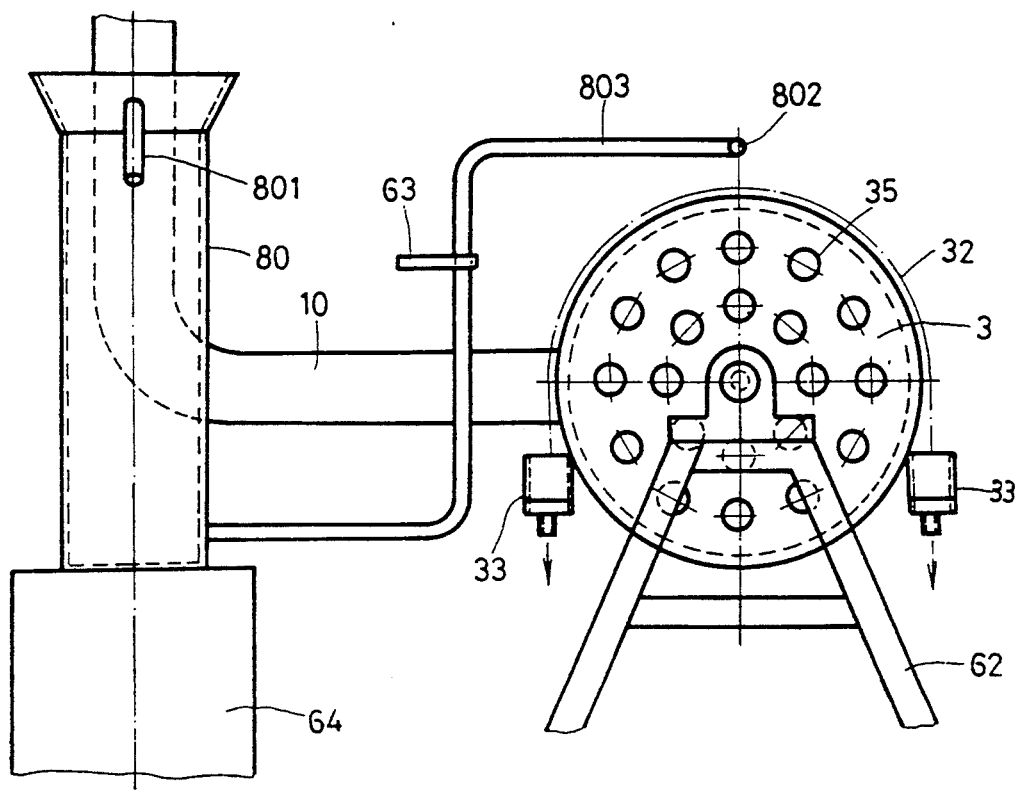
FIG. 33 is another side view of FIG. 31.

FIGS. 31, 32 and 33 illustrate the structure of a coarse ash collector according to the present invention. The coarse ash collector may remove bigger particles from the exhaust gas passing through, and therefore it greatly reduces the burden of the smoke filter. As illustrated in FIGS. 31, 32 and 33, The coarse ash collector is generally comprising a collecting cylinder drum 3, two water collecting troughs 33, a soaking net 32, a suction pipe 4, a suction pump 41, a driving device 7, and a revolving shaft support assembly 62. The collecting cylinder drum 3 has two man holes 31 on the front side adjacent to two opposite ends thereof, through which the inside of the collecting cylinder drum 3 can be checked or a repair work can be performed. The soaking net 32 is covered over the upper half of the belly of the collecting cylinder drum 3, through which inside heat is dissipated. The water collecting troughs 33 have each a broad open top and a drain hole on the bottom, and are symmetrically fastened to the lower half of the belly of the collecting cylinder drum 3. The collecting cylinder drum 3 has a plurality of air-vents 35 on the left end edge thereof. The air-vents 35 are each covered with a respective adjustable cover board for regulating the flow rate of cooling air passing through. The air-vents 35 are disposed in different directions so that the currents of cooling air which pass through the air-vents 35 into the collecting cylinder drum 3 into a turbulent flow to disturb the smoke which is induced into the collecting cylinder drum 3 and make it cool. The cooler which provides cooling air and related piping of the cooler are installed according to ordinary techniques and not shown in the drawings. The right end of the collecting cylinder drum 3 is enclosed. The collecting cylinder drum 3 has a central shaft 34 extended to the outside with one end coupled to the driving device 7 and an opposite end disposed in a bearing block 621 on a support 63. The driving device 7 is comprising a reducing gear box driven to rotate the central shaft 34 of the collecting cylinder drum 3 by a motor. Any suitable mechanical driving device may also be employed for rotating the central shaft of the collecting cylinder drum 3. The driving device 7 is supported on a support base 61. The suction pipe 4 is fixed to the collecting cylinder drum 3 on the bottom by a plurality of clip rings 42. The suction pipe 4 is provided an end coupled to the suction pump 41, and another end enclosed. The outlet of the suction pump 4 is detachably fixed to a flexible, porous filter bag 81. When the suction pump 41 was operated, coarse ashes sucked from the collecting cylinder drum 3 into the filter bag 81. The suction pump 41 is made through ordinary techniques, and therefore its structure is not described in detail. There is provided a smoke pipe 10 having one end connected to the belly of the collecting cylinder drum 3 and an opposite end connected to a smoke filter of the present invention. Therefore, the smoke which is discharged out of the collecting cylinder drum 3 is guided into the smoke filter for further treatment. The dirty water which is discharged out of the smoke filter through the drain pipe thereof delivered to a waste water tank 80. The waste water tank 80 has a plurality of branch pipes 803 on the front bottom thereof connected to a perforated transverse pipe 802. The perforated transverse pipe 802 has a plurality of drip holes through which water from the branch pipes 803 drops to the soaking net 32 to cool the the collecting cylinder drum 3. The water which passes through the soaking net 32 is gathered by the water collecting troughs 33 and delivered to a waste water treatment device. Because most dirty substances in the dripped waste liquid may be retained by the soaking net 32, the water which is collected by the water collecting troughs 33 is less turbid and can be delivered to a compact-type waste water treatment device. A bag filter device may be used to treat the water from the water collecting trough 33 if the water is still turbid. The bag filter device and the compact type waste water treatment device will be described in detail later. The branch pipes 803 are respectively fastened in place by a respective locating frame 63, which is made through ordinary techniques. The waste water tank 80 has an overflow pipe 801 on the left side, which delivers overflow to a suitable waste water treatment device for further treatment. A supporting base 64 is provided to support the waste water tank 80 in place.

Figure 34:
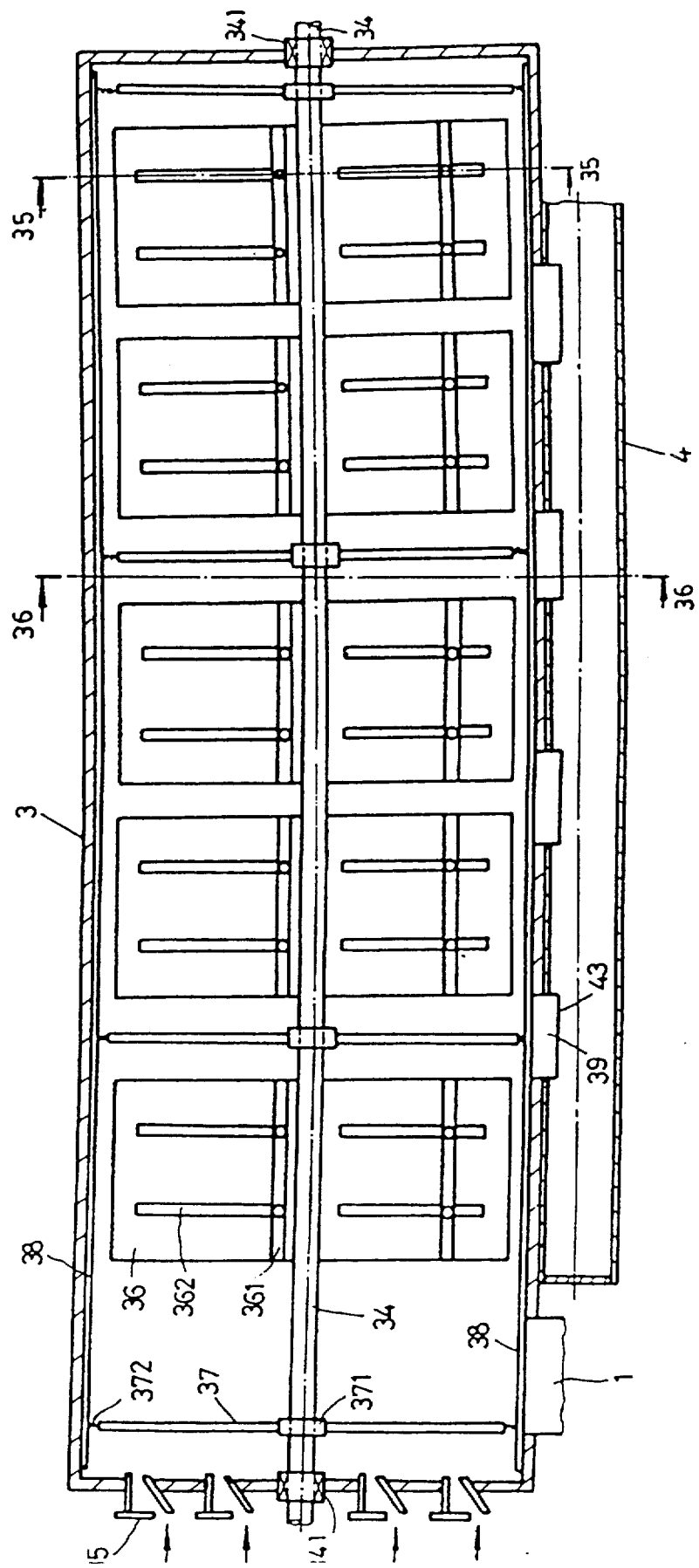
FIG. 34 is a cross sectional view of the collecting cylinder drum in the coarse ash collector shown in FIG. 31.

FIG. 34 is a cross section of the collecting cylinder drum 3 and part of the suction pipe 4, showing the internal parts of the collecting cylinder drum 3 and the connection of the suction pipe 4 to the collecting cylinder drum 3. The central shaft 34 of the collecting cylinder drum 3 is attached with pairs of attachment plate sets. Each of the attachment plate sets is provided with a distance apart from each other respectively and provided with a plurality of radial disposed attachment plates 36. Each attachment plate 36 has two elongated parallel holes 362 through which a pair of sliding scraping bars 361 on either outer side of the attachment plate 36 respectively may be fixed together. The central shaft 34 has a plurality of collars 371 spaced from one another, which are each attached with two radial rods 37 spaced through 180° angle. The radial rods 37 have each the respective end coupled with a respective compression spring 372, which are respectively connected to two opposite, transverse scraping bars 38. The length of the radial rods 37 is shorter than the inner diameter of the collecting cylinder drum 3. The compression springs 372 provide each a spring force, the two transverse scraping bars 38 are forced to contact the inside wall of the collecting cylinder drum 3. The length of the transverse scraping bars 38 is equal to the length of the inside wall of the collecting cylinder drum 3. Therefore, the coarse ash which is adhered to the inside wall of the collecting cylinder drum 3 will be removed by the two transverse scraping bars 38 as the central shaft 34 of the collecting cylinder drum 3 is rotated. A plurality of dust outlets 39 are spacedly provided on the bottom of the collecting cylinder drum 3 through which fallen dust may be sucked out of the collecting cylinder drum 3. The suction pipe 4 has a plurality of dust inlets 43 respectively aligned with the dust outlets 39, through which fallen dust is sucked to the porous, flexible filter bag 81. The position of the sliding scraping bars 361 and the communication between the dust outlets 39 and the dust inlets 43 are shown in FIGS. 35 and 36.

Figure 35:
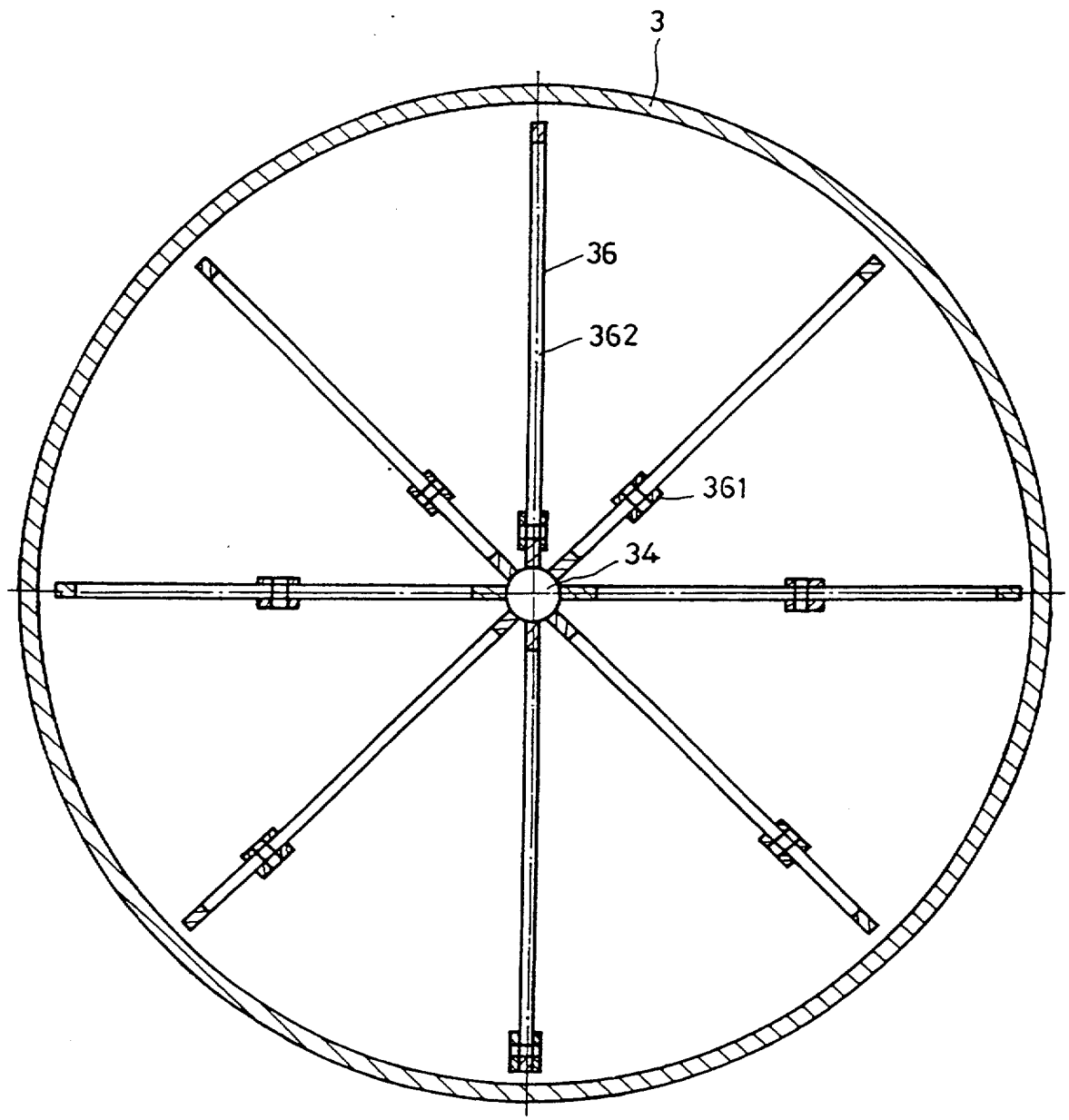
FIG. 35 is a cross sectonal view along line 35-35 in FIG. 34 showing the sliding scraping bars over the attachment plates.
Figure 36:
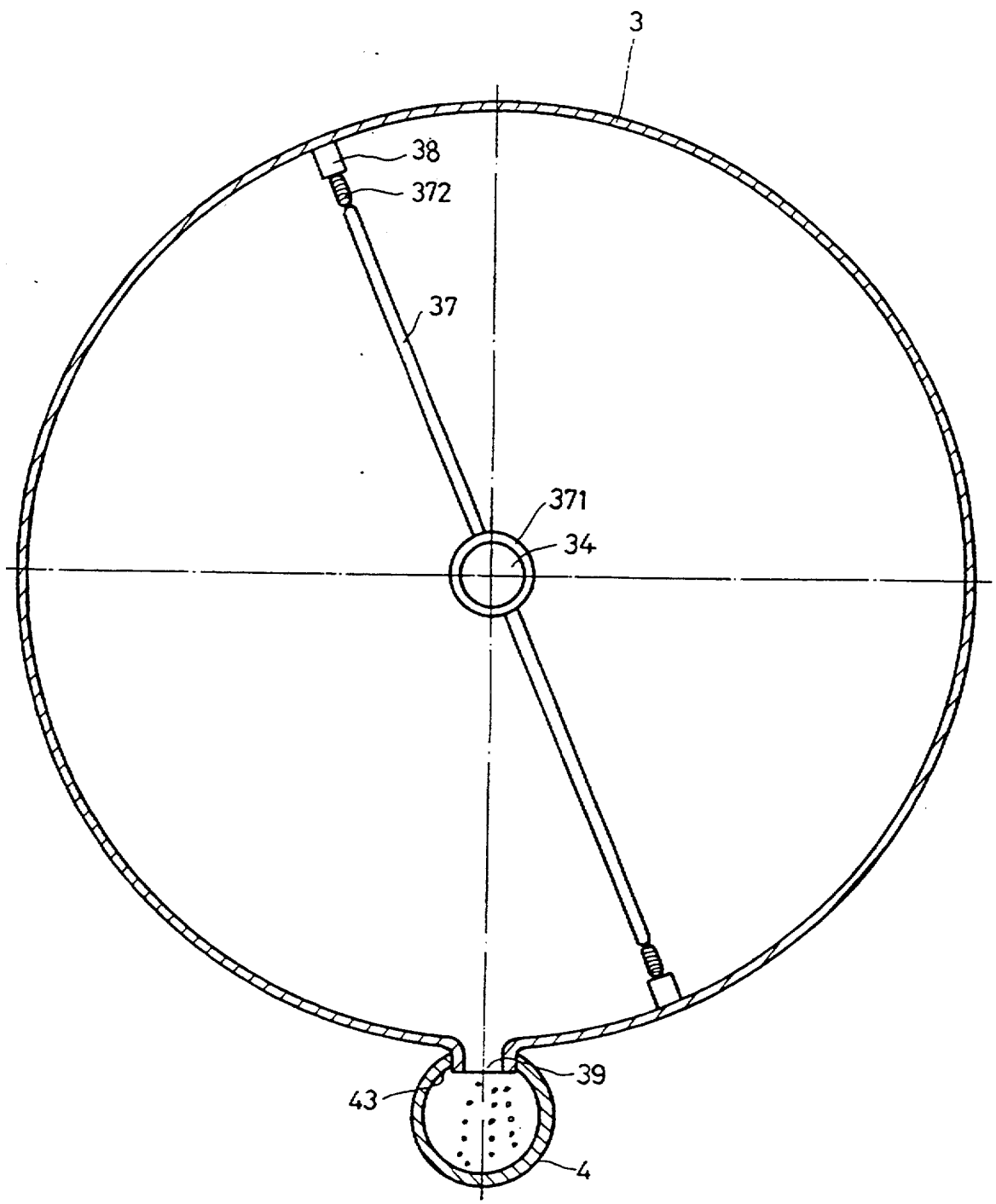
FIG. 36 is a cross sectional view along line 36-36 in FIG. 34 showing the location of the transverse scraping bars.

FIG. 35 is a cross section taken on line 35-35 of FIG. 34. As illustrated, the attachment plates 36 of each attachment plate set are equiangularly fixed to the central shaft 34. The sliding scraping bars 361 are movably secured to the attachment plates 36 and closely disposed in contact with the outside surface of the attachment plates 36 respectively. Rotating the central shaft 34 causes each pair of the sliding scrapping bars 361 to slide back and forth on the attachment plates 36, and therefore smoke-ash is removed from the attachment paltes 36. FIG. 36 is a cross section taken on line 36-36 of FIG. 34. The collars 371 are respectively mounted on the central shaft 34 by a key or screw (not shown). The radial rods 37 on each collar 371 are spaced from each other through 180° angle. The two transverse scraping bars 38 are closely attached to the inside wall of the collecting cylinder drum 3. The dust outlets 39 are respectively inserted in the dust inlets 43, and therefore the dust can be sucked to the porous, flexible filter bag 81 by the suction pump 41 through the suction pipe 4.

Figure 37:
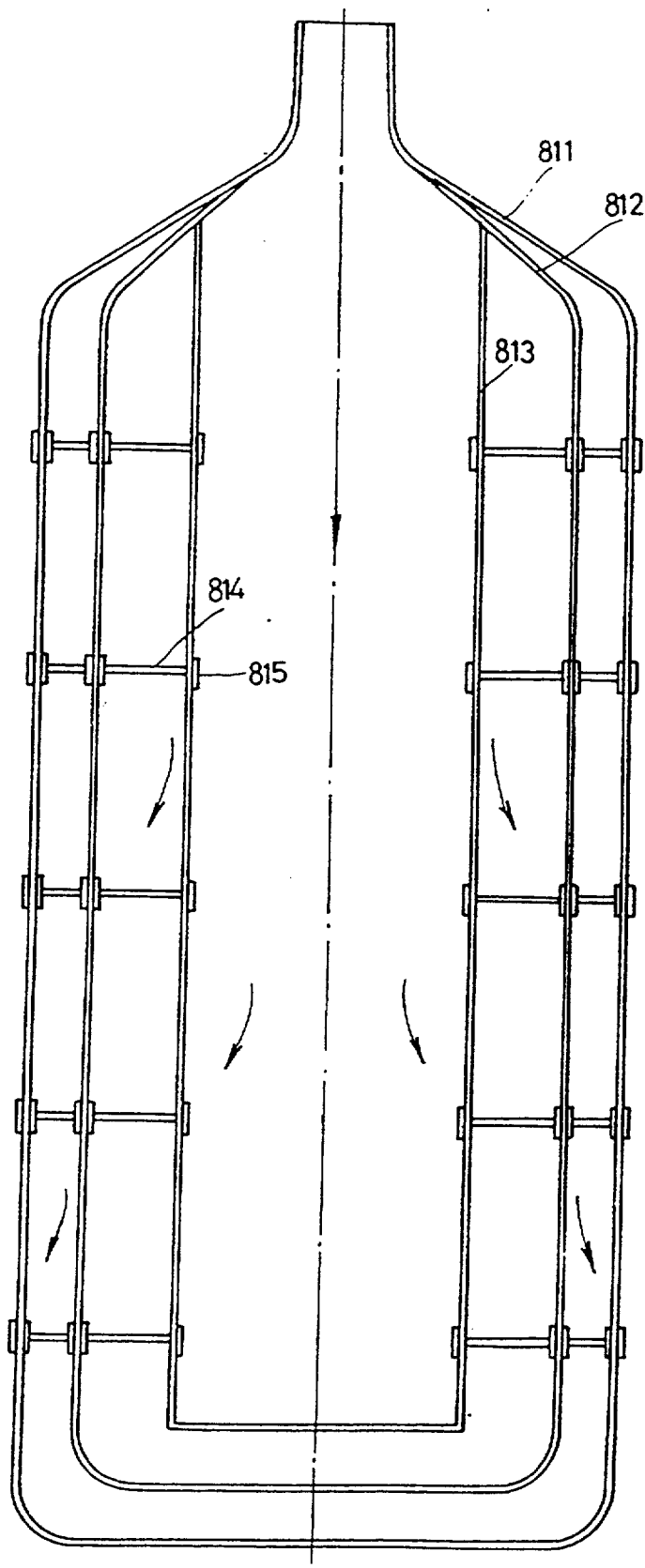
FIG. 37 is a cross sectional view of a filter bag in the coarse ash collector of FIG. 31
Figure 37A:
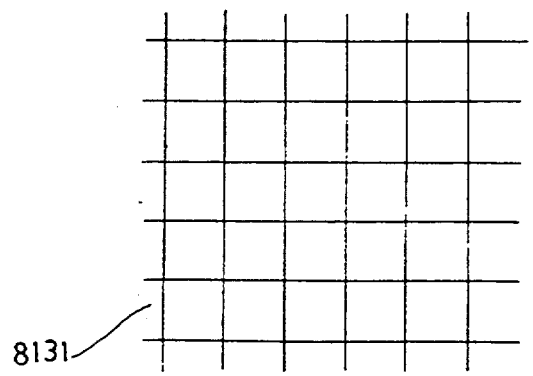
FIG. 37a is a diagram illustrating the largest mesh size for the filter bag shown in FIG. 37.
Figure 37B:
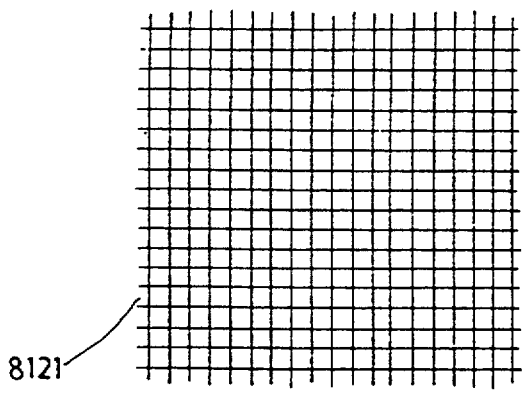
FIG. 37b is a diagram illustrating the intermediate mesh size for the filter bag shown in FIG. 37.
Figure 37C:
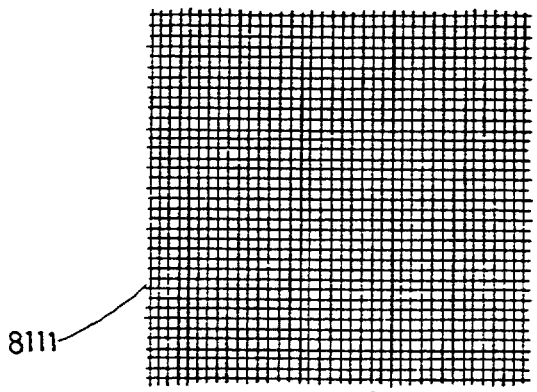
FIG. 37c is a diagram illustrating the smallest mesh size for the filter bag shown in FIG. 37.

FIG. 37a-c illustrates the internal structure of the porous, flexible filter bag 81. The filter bag 81 is made of porous and flexible fibers, and consists of an internal layer 813, an external layer 811 and an intermediate layer 812, which are fastened together by connecting straps 814 and reinforcing straps 815. The mesh size on the internal layer 813 is bigger than that of the intermediate layer 812 and the outer layer 811, and the mesh size on the intermediate layer 812 is bigger than that of the outer layer 811. Therefore, the biggest ash particles can be retained inside the internal layer 813, less thicker ash particles can be retained inside the intermediate layer 812, and finest ash particles can be retained inside the outer layer 811.

As described above and indicated in FIGS. 31 through 37, the exhaust smoke from the exhaust pipe is firstly guided into the collecting cylinder drum 3 as the collecting cylinder drum 3 is rotated and a flow of cooling air is continuously guided into the collecting cylinder drum 3 to cool down the exhaust smoke. At the same time, the scraping bars 361, 38 are moved to remove the dust from the attachment paltes 36 and the inside wall of the collecting cylinder drum 3. The dust is then sucked through the suction pipe 4 into the filter bag 81. The smoke which flows out of the collecting cylinder drum 3 passes through the smoke pipe 10 into the smoke filter to receive further treatment. The waste water which was discharged out of the smoke filter through the drain pipe thereof may be delivered through the waste water tank 80, the branch pipes 803 and the perforated transverse pipe 802, and at the final, the waste water drops through the holes on the perforated transverse pipe 802 to cool the collecting cylinder drum 3.

Figure 38:
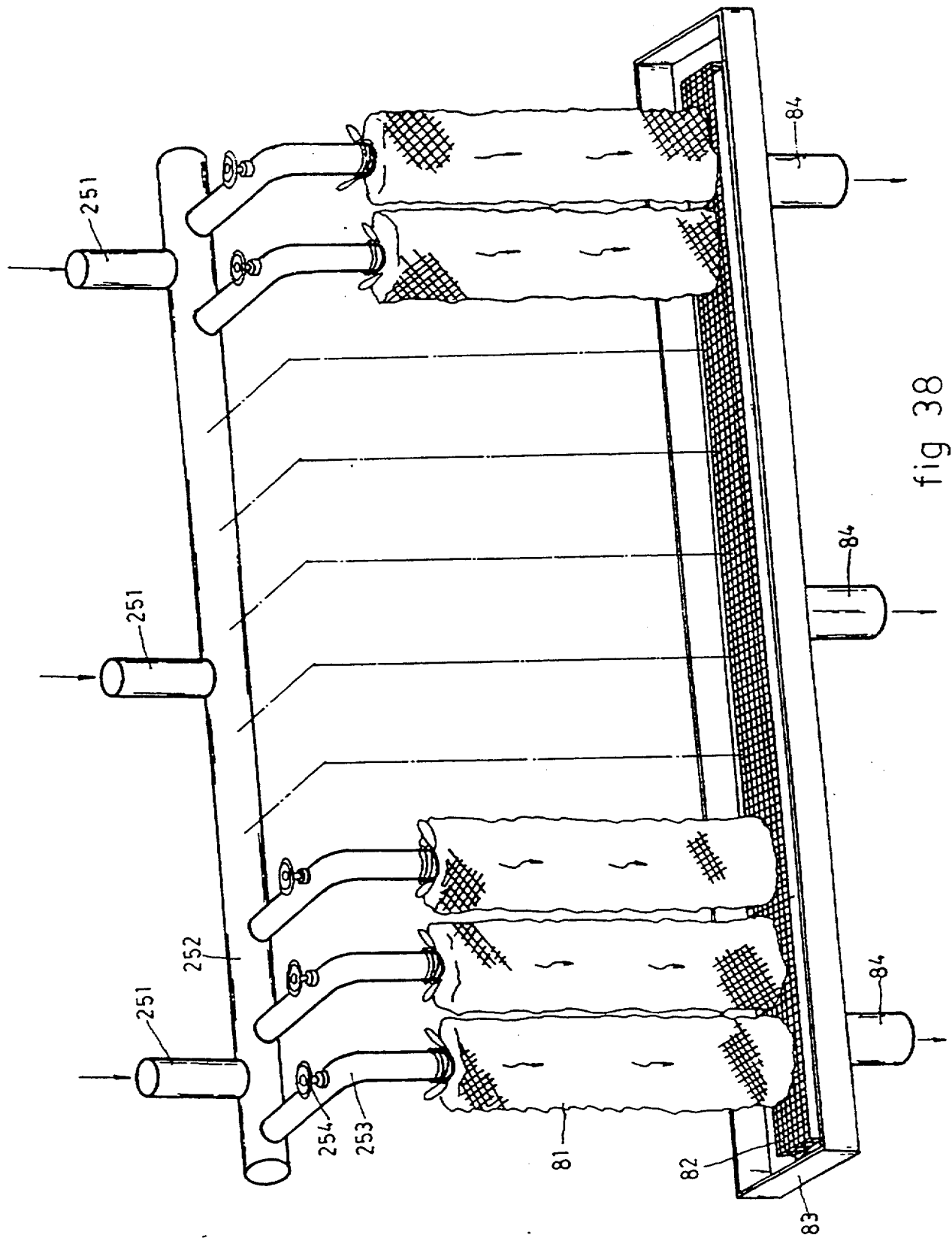
FIG. 38 is a perspective view of a bag filter device in the filter system according to the present invention.

FIG. 38 illustrates a bag filter device 8 for treating the waste water from the smoke filter. The bag filter device 8 is composed of a plurality of waste water pipes 251 connecting the drain pipe 25 to a transverse pipe 252, which has a plurality of L-shaped branch pipes 253 respectively connected to filter bags 81. The filter bags 81 are supported on an elongated water trough 83, which has a plurality of drain pipes 84 on the bottom. Through the drain pipes 84, the water which passed through the filter bags 81 is delivered to a water treatment device. The elongated water trough 83 is covered with a wire gauze stand 85 on the inside, onto which the filter bags 81 are supported. Similar to the filter bag illustrated in FIG. 37, the filter bags 81 are made of flexible fibers and consisting of a plurality of filtration layers either. The filter bags 81 may be fastened to the branch pipes 253 by ropes or any other suitable fastening elements, so that they can be conveniently detached from the branch pipes 253 for replacement. The branch pipes 253 are each provided with a shutoff valve 254, which is turned off as the respective filter bag 81 is detached from the respective branch pipe 253.

Figure 39:
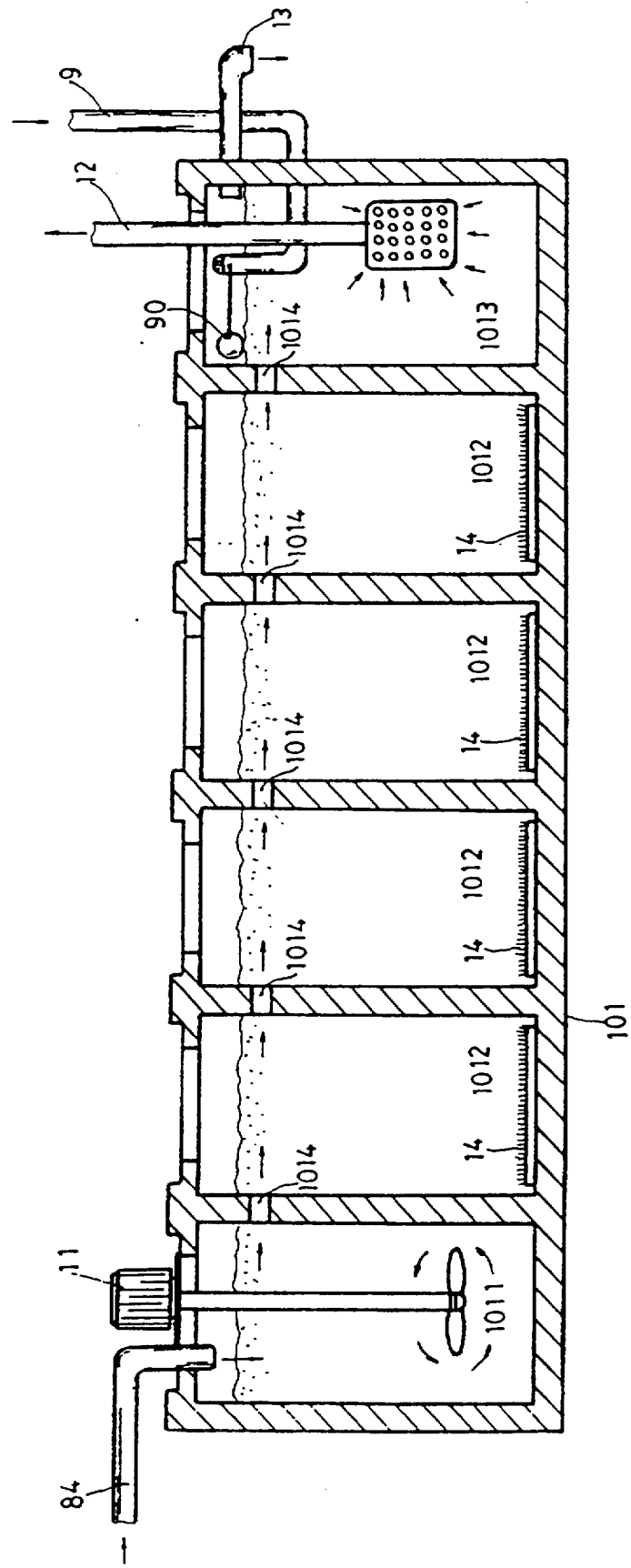
FIG. 39 is a cross sectional view of a water treatment device in the filter system according to the present invention.

FIG. 39 illustrates a water treatment device 101 for treating the water discharged through the drain pipes 84. The filtrated liquid obtained from the filter bags 81 is relatively clean. In order to make it more clean for repeated use, the water treatment device 101 is employed. The water treatment device 101 is generally comprising a mixing trough 1011, a plurality of sedimentation troughs 1012 and a clean water trough 1013 connected in series. The troughs 1011, 1012, 1013 are respectively made in a rectangular shape, and the volume of the troughs 1011,1012,1013 may be determined according to different requirements. The mixing trough 1011 receives the liquid discharged through the drain pipes 84, having a mixer controlled to mix the water received. Holes 1014 are respectively made between each two adjacent troughs for passing the liquid, and therefore the liquid can be delivered from one trough to another. At the final, the liquid collected in the clean water trough 1013 is very clean and suitable for repeated use. In each sedimentation trough, there is provided a dust collecting board 14 on the inside bottom. The dust collecting board 14 can be big enough to cover over all the surface of the inside bottom of the respective sedimentation trough. The clean water trough 1013 has at least one suction pipe 12 to deliver the well treated clean water to the smoke filter as part of the working fluid. The clean water which is sucked out of the clean water trough 1013 through at least one suction pipe 12 may be mixed with a lime powder, a soap water, a refrigerated water or any suitable detergents before being delivered to the sprayers in the smoke filter. Clean liquid may be supplied from a clean liquid supplementary to the clean water trough 1013 through a water supply pipe 9, which is controlled by a float valve 90 in the clean water trough 1013 at a predetermined level. As the water level in the clean water trough 1013 drops below the predetermined level, the float valve 90 is moved from the outlet of the water supplementary pipe 9, and therefore a flow of clean water is automatically discharged from the water supplementary pipe 9 into the clean water trough 1013. There is an overflow pipe 13 disposed adjacent to the top edge of the clean water trough 1013 to discharge overflow.

Figure 40:
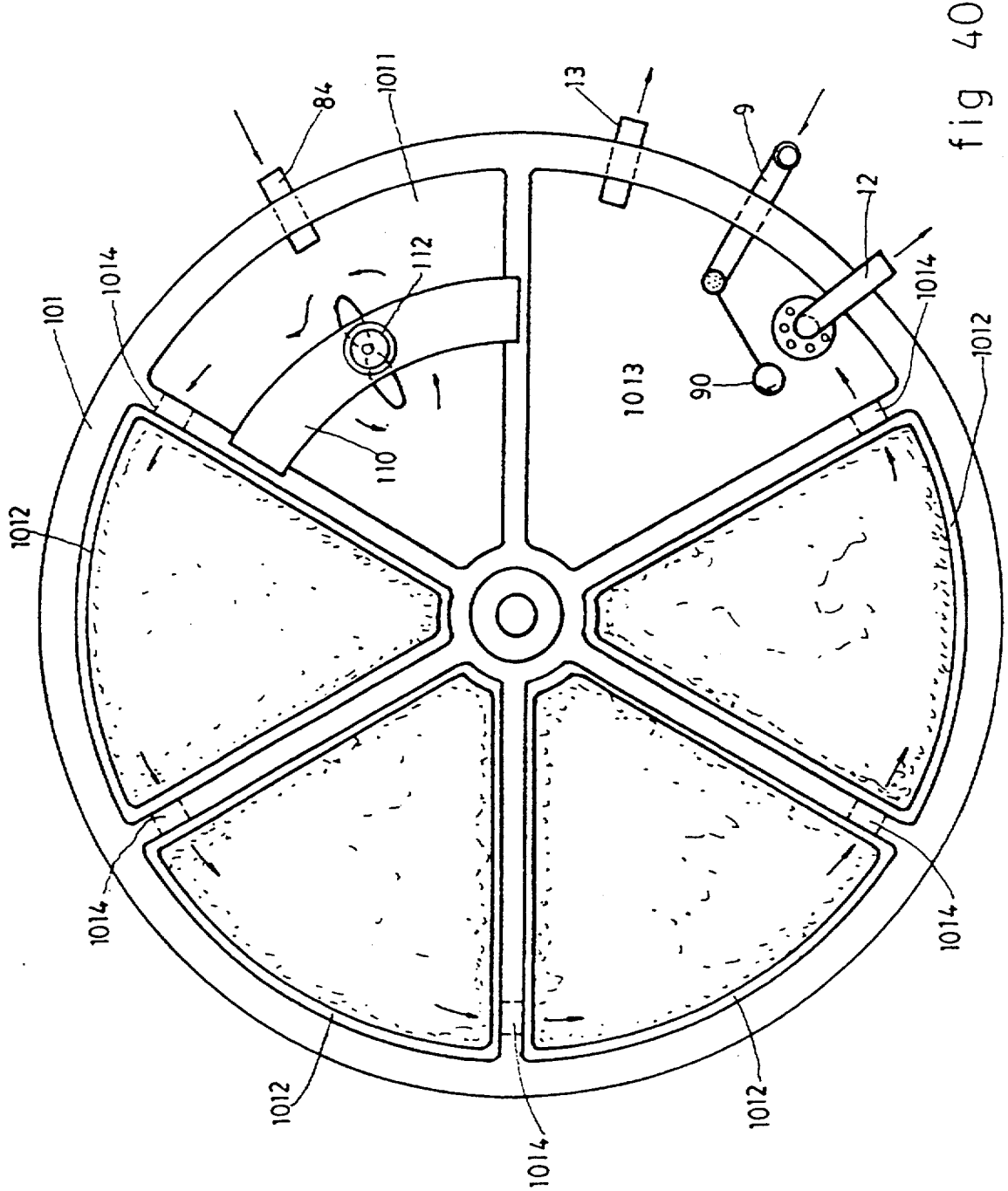
FIG. 40 is a top view of another embodiment of the water treatment device.
Figure 41:
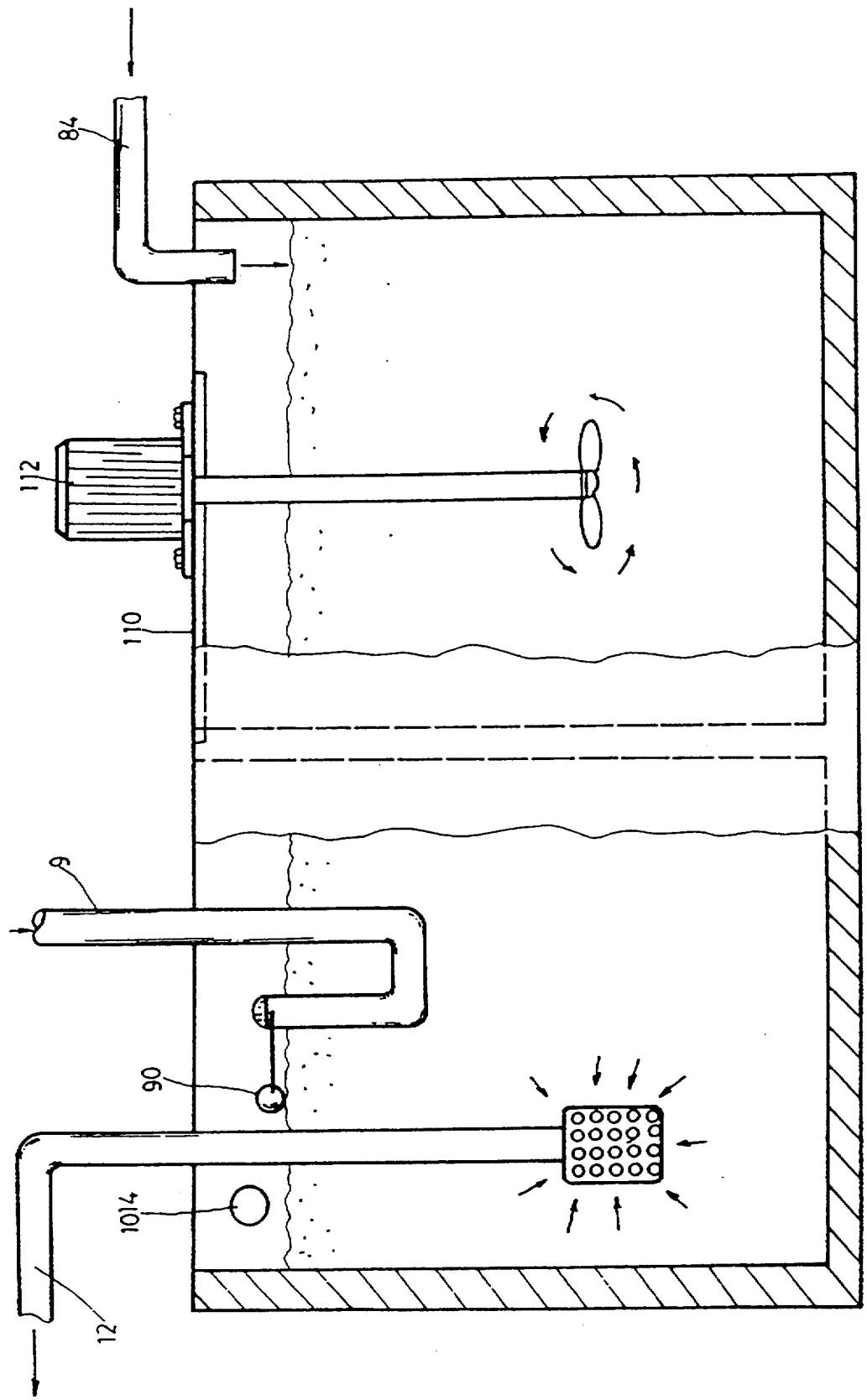
FIG. 41 is a cross sectional view of FIG. 40 showing the piping arrangement in the mixing trough and the clean water trough respectively.

Referring to FIGS. 40 and 41, therein illustrated is an alternate form of the water treatment device 101. In this embodiment, the water treatment device 101 i--% made in a cylindrical shape, and the troughs are respectively made in the shape of a sector. The mixer 11 in the mixing trough 101 is fastened in place by a supporting plate 110. Similar to the water treatment device in FIG. 39, the liquid which was discharged through the drain pipes 84 from the filter bags 81 is guided into the mixing trough 1011, and then guided through the holes 1014 into the sedimentation troughs 1012, and at the final the liquid is guided from the sedimentation troughs 1012 to the clean water trough 1013, from which the clean liquid is sucked into the suction pipe 12 for repeated use. The structure of this alternate form is same as the embodiment indicated in FIG. 39. The advantage of this alternate form is that it requires less installation space.

Figure 42:
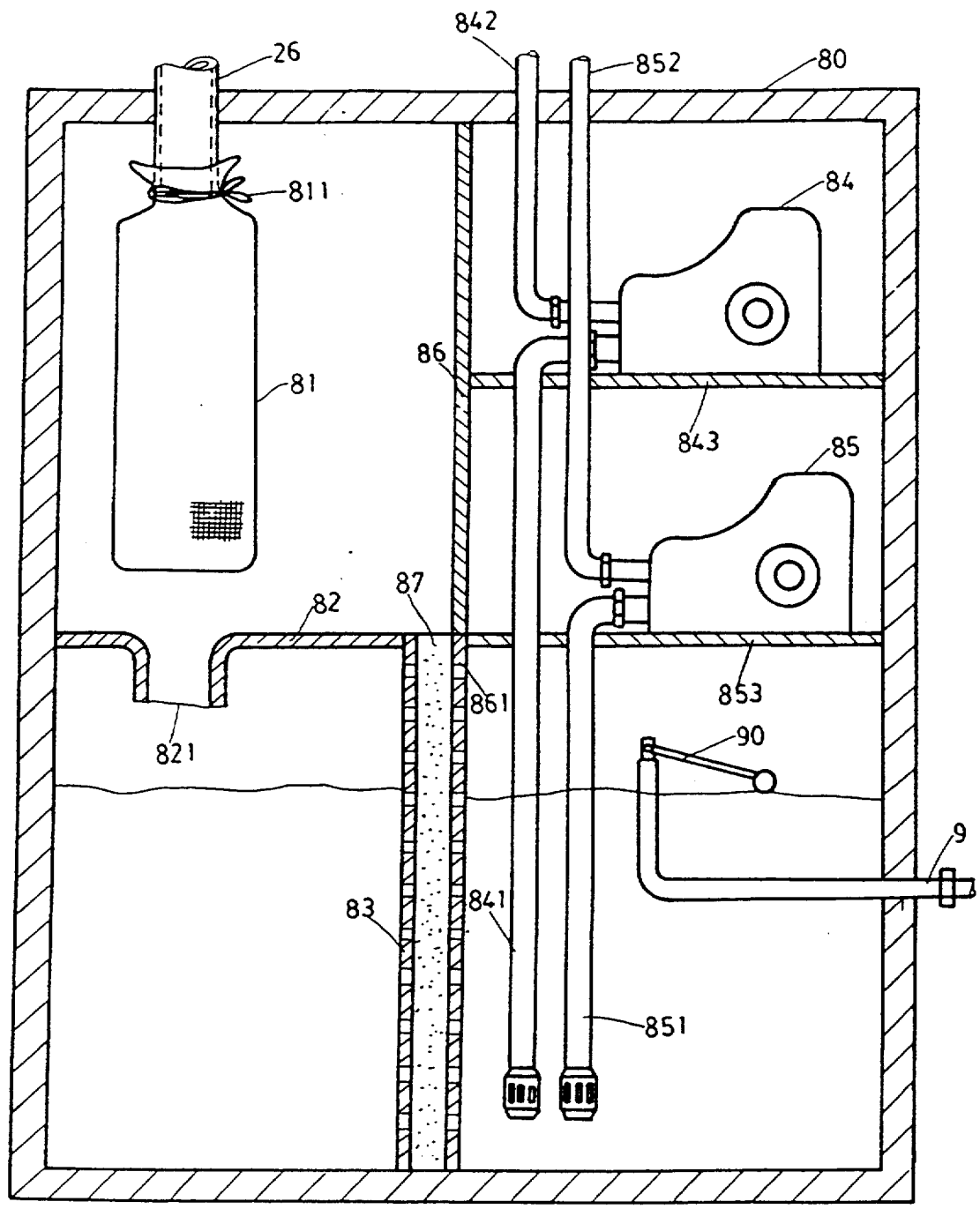
FIG. 42 is a cross sectional view of a compact type water treatment device in the filter system according to the present invention showing the inner arrangement.
Figure 43:
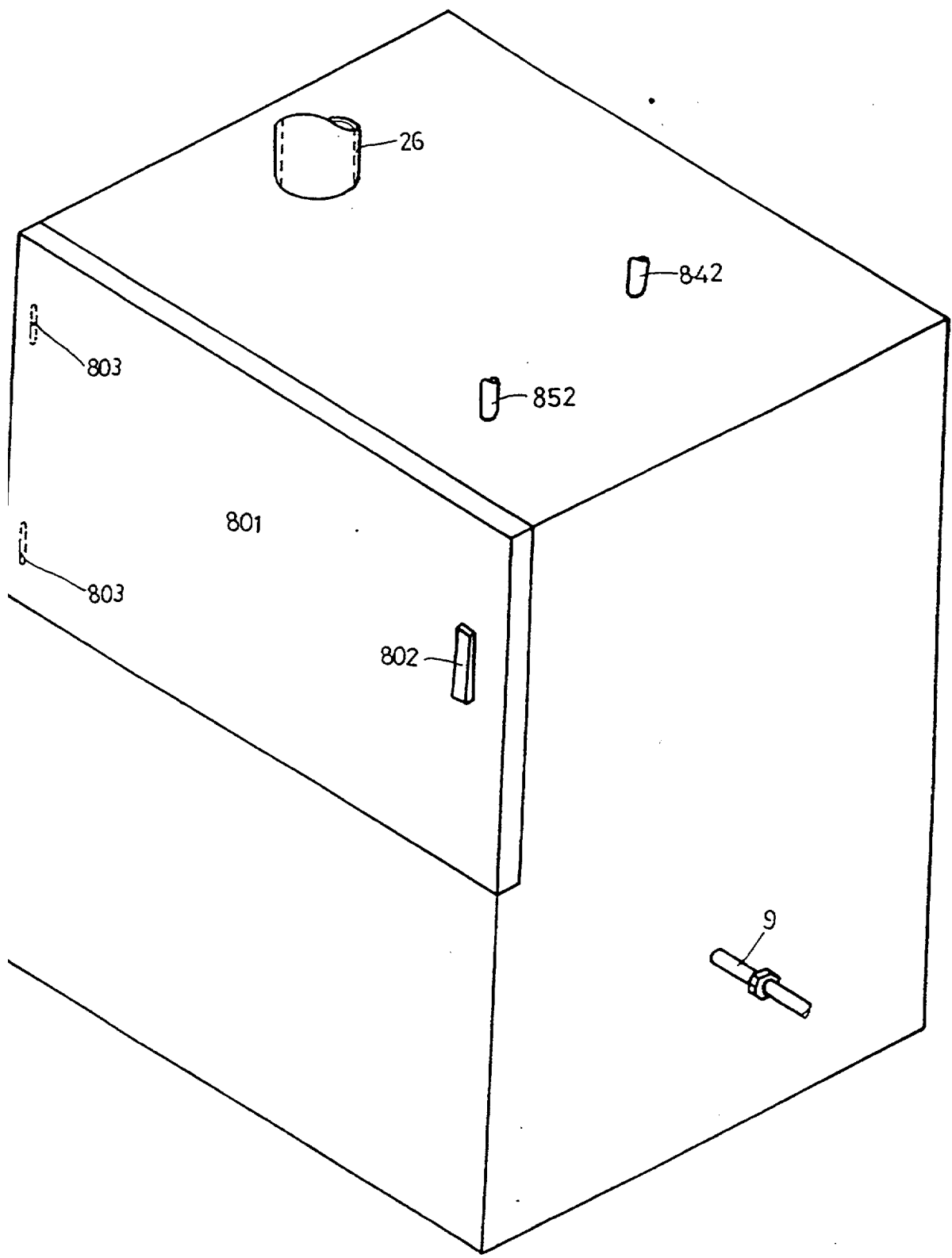
FIG. 43 is a perspective view of the outer appearance of Pig. 42.

Referring to FIGS. 42 and 43, therein illustrated is a compact type of water treatment device according to the present invention, which is generally comprising a casing 80, a filter bag 81, a water collecting plate 82, a perforated division board 83, two high-pressure water pumps 84,85, a central division board 86, a filtering element 87, and a float valve 90. The drain pipe 26 of the smoke filter according to the present invention is projected into the casing 80. The filter bag 81 is fastened to the drain pipe 26 to receive the waste liquid discharged therefrom. In the drawing, the filter bag 81 is fastened to the drain pipe 26 by a tie rope 811. Of course, any suitable fastening devices may be used to fasten the filter bag 81 to the drain pipe 26. The filter bag 81 is made from a flexible material. When the discharged liquid passed through the filter bag 81, the particles are removed from the liquid and gathered in the filter bag 81. The water collecting plate 83 has a water hole 821, through which the collected liquid flows to the left bottom of the casing 80, and then passes through the perforated division board 83 and the filtering element 87, which is disposed between the central division board 86 and the perforated division board 83. After filtrated through the filtering element 87, the liquid flows to the right bottom inside the casing 80. The first high-pressure water pump 84 and the second high-pressure water pump 85 are respectively supported on supporting plates 843,853 fastened in the casing 80 on the right side. The position of the first high-pressure water pump 84 is disposed at a level above the second high-pressure water pump 85. The first and second high-pressure water pumps 84, 85 have each two opposite ends coupled respectively with a suction pipe 841 or 851 and a outlet pipe 842 or 852 for pumping a flow of liquid from the right bottom of the casing 80 to the sprayers of the smoke filter or the polluted air filter for treating the exhaust smoke. A water supplementary pipe 9 is connected to the right side of the casing 80 and controlled by a float valve 90 to supply a clean liquid as the water level in the right side of the casing 80 drops below a predetermined height. An access door 801 is hinged to the casing 80 on the front side thereof by a hinge 803. The access door 801 has a handle 802 for gripping. Through the handle 802, the access door 801 can be conveniently opened for performing a maintenance or repair work.

In general, the present invention is to provide a smoke filter system including a smoke filter, a polluted air filter, a bag filter device and a water treatment device. The smoke filter 2 is firstly operated to remove harmful substances from the exhaust gas or high-pressure smoke passing through. The waste liquid from the smoke filter 2 is delivered to the bag filter device to remove pollutants. The liquid discharged from the bag filter device is delivered to the water treatment device 101, and then treated into a clean liquid for a repeated use. Highly turbid smoke may be treated through a coarse ash collecting device before the treatment through the smoke filter 2 so as to reduce the burden of the smoke filter 2. The less turbid waste liquid may be directly delivered to the compact type of water treatment device to receive a treatment, and therefore the liquid can be quickly treated for further circulation.

We claim:

1. A filter system for smoke or polluted air, comprising:
   a) a liquid power sprayer filter device through which said smoke or polluted air is directed, which comprises
      A) a sinuously upwardly extending duct formed by a plurality of transverse duct sections interconnected by a plurality of end connectors forming a plurality of bends, the lowest duct section having an open end forming a draft intake opening proximate to a smoke inlet port and the topmost duct section exhausting to the atmosphere at an unconnected end thereof;
      B) a plurality of liquid power sprayer sets disposed vertically in said end connectors and transversely in said duct sections; and
      C) a power blowing fan disposed at the draft intake opening of the lowest duct section of said upwardly extending duct;
   b) a bag filter device communicating with said liquid power sprayer filter device for cleansing the waste liquid received from said liquid power sprayer filter device; and
   c) a water treatment device communicating with said bag filter device for receiving from said bag filter device the liquid treated thereby and further treating said liquid so as to render said liquid suitable to be recirculated for repeated use.

2. The filter system as defined in claim 1, wherein said lowest duct section at said smoke inlet port is formed by a detachable short duct section having the smoke inlet port at the bottom thereof and having a water chamber substantially around the outer surface of said short duct section.

3. The filter system as defined in claim 2, wherein a cooling water intake pipe and a cooling water outlet pipe are connected to said short duct section, said cooling water intake pipe including a branch portion with a plurality of drip holes disposed in said cooling water chamber.

4. The filter system as defined in claim 1, wherein said topmost duct section is provided with an end connecting with the upmost one of said plurality of end connectors and exhaust end with a water stopper for cleaned air flowing out.

5. The filter system as defined in claim 1, wherein each of said plurality of power sprayers sets comprises a plurality of spray nozzles connected to a plurality of parallel water pipes arranged rectangularly and secured to said end connectors and said transverse duct sections.

6. The filter system as defined n claim 5, wherein each of said plurality of power sprayers sets is formed in an arched shape nd fastened to said transverse duct sections having round shaped walls.

7. The filter system as defined in claim 1, wherein each of said plurality of power sprayers sets is comprised of a single water pipe having a plurality of spray nozzles arranged thereon.

8. A filter system for smoke or polluted air, comprising:
   a) a liquid power sprayer filter device through which said smoke or polluted air is directed, which comprises
      A) a cylindrically shaped upwardly extending duct having a horizontally extending duct section disposed at the bottom thereof with a draft intake opening at an end thereof and a smoke inlet port, said upwardly extending duct further having an outlet at the top thereof;
B) a spiral guide disposed in said cylindrically shaped duct formed by an upwardly swirling plate fixed to an inner wall of said duct;
C) a center pipe disposed centrally in said spiral guide having a plurality of water openings therein;
D) a plurality of liquid power sprayers arranged in said upwardly extending duct;
E) a power blowing fan disposed at the draft intake opening in said horizontally extending duct section; and
F) a water pump located at a lower level of said upwardly extending duct having an intake connected to said center pipe and an outlet disposed in said upwardly extending duct to pump waste water from said center pipe to said spiral guide;
b) a bag filter device communicating with said liquid power sprayer filter device for cleansing the waste liquid received from said liquid power sprayer filter device; and
c) a water treatment device communicating with said bag filter device for receiving from said bag filter device the liquid treated thereby and further treating said liquid so as to render said liquid suitable to be recirculated for repeated use.

9. The filter system as defined in claim 8, wherein at least one man hole is provided proximate the lower end of said upwardly extending duct.

10. The filter system as defined in claim 8, wherein said cylindrically shaped upwardly extending duct is tapered gradually reducing upwardly.

11. The filter system for smoke or polluted air as defined in claim 8, wherein the outlet of said upwardly extending duct comprises a pipe extending outwardly and fixed to a peaked top of said upwardly extending duct.

12. The filter system for smoke or polluted air as defined in claim 8, wherein the outlet of said upwardly extending duct comprises a pipe extending inwardly and fixed to a slightly inwardly inclining flat top of said upwardly extending duct.

13. The filter system as defined in claim 8, wherein the cross section of said cylindrically shaped duct is circular.

14. The filter system as defined in claim 8, wherein the cross section of said cylindrically shaped duct is oval.

15. The filter system as defined in claim 8, wherein said smoke inlet port comprises a plurality of ports.

16. A filter system for smoke or polluted air, comprising:
a) a liquid power sprayer filter device through which said smoke or polluted air is directed, which comprises
A) a zigzagging upwardly extending duct having a high pressure smoke intake port and a regular smoke intake port at a wider bottom thereof and an outlet at a flat top thereof;
B) a baffle-board device comprised of a baffle-board and a biasing spring therefor disposed adjacent the bottom of said upwardly extending duct directly above said high pressure smoke intake port, said baffle-board being inclined in said duct and fixed at a side thereof to an inner wall of said duct at the bottom thereof and said spring interconnecting an inner wall of said duct with the back of said baffle-board at an upper central position thereof; and
C) a plurality of liquid power sprayer sets arranged in the inner wall of said upwardly extending duct;
b) a bag filter device communicating with said liquid power sprayer filter device for cleansing the waste liquid received from said liquid power sprayer filter device; and
c) a water treatment device communicating with said bag filter device for receiving from said bag filter device the liquid treated thereby and further treating said liquid so as to render said liquid suitable to be recirculated for repeated use.

17. The filter system as defined in claim 16, wherein the starting and stopping of said plurality of power sprayers sets is controlled by means of a plurality of pressure regulated switches wherein said plurality of pressure regulated switches are turned on and turned off in dependence on the high pressure smoke reaching a predetermined pressure.

18. A filter system for smoke or polluted air, comprising:
a) a liquid power sprayer filter device through which said smoke or polluted air is directed, which comprises
A) a multi-section horizontal duct consisting of a plurality of duct sections wherein a first duct section includes a draft intake opening and a smoke inlet port and a last duct section includes an outlet for treated air;
B) a plurality of liquid power sprayer sets arranged in said plurality of duct sections;
C) a suction fan disposed at the outlet for treated air in said last duct section for removing said treated air;
D) a plurality of speed adjustable blowing fans disposed respectively in said plurality of duct sections; and
E) a plurality of splashing nets disposed respectively in said plurality of duct sections to splash a mist of working liquid in all directions;
b) a bag filter device communicating with said liquid power sprayer filter device for cleansing the waste liquid received from said liquid power sprayer filter device; and
c) a water treatment device communicating with said bag filter device for receiving from said bag filter device the liquid treated thereby and further treating said liquid so as to render said liquid suitable to be recirculated for repeated use.

19. A filter system for smoke or polluted air, comprising:
a) a liquid power sprayer filter device through which said smoke or polluted air is directed, which comprises
A) a primary filter unit wherein substantially all dirty substances in the smoke are removed, which includes
i) a smoke gathering shell consisting of an enclosure with an inclined roof with a plurality of spaced openings on both slanted lateral walls and with a horizontally disposed cylindrical top;
ii) a long duct having an upper end communicating with said cylindrical top and extending downwardly along said shell for connection to a waste liquid discharge at a lower end of said shell;

iii) a plurality of liquid power sprayers disposed in said spaced openings in said shell and in said long duct proper;
iv) a plurality of splashing nets disposed in said long duct proper; and
v) a waste liquid collecting chamber disposed at the bottom of said shell comprising a slanted collecting pan having a waste liquid discharge opening connected to said waste liquid discharge and at least one smoke inlet port;
B) a secondary filter unit wherein the finer substances in the smoke are removed; and
C) a suction pump disposed between said primary and secondary filter units;
b) a bag filter device communicating with said liquid power sprayer filter device for cleansing the waste liquid received from said liquid power sprayer filter device; and
c) a water treatment device communicating with said bag filter device for receiving from said bag filter device the liquid treated thereby and further treating said liquid so as to render said liquid suitable to be recirculated for repeated use.

20. The filter system as defined in claim 19, wherein said secondary filter unit comprises:
a) a smoke cooling and cleaning upwardly extending duct having an inlet opening in the wall proximate the bottom thereof and a clean air outlet pipe at the top thereof;
b) a coil pipe arranged around the inner wall of said duct having an outlet and an inlet connected with a cold air or refrigerated water supply source;
c) a plurality of liquid power sprayers arranged in said smoke cooling and cleaning duct;
d) a plurality of splashing nets arranged in said smoke cooling and cleaning duct; and
e) a waste liquid filter tank arranged proximate the bottom of said smoke cooling and cleaning duct, the upper portion of said filter tank communicating with the bottom of said smoke cooling and cleaning duct, said filter tank including a plurality of filtering webs therein and a discharge pipe.

21. A filter system for smoke or polluted air, comprising:
a) a liquid power sprayer filter device through which said smoke or polluted air is directed, which comprises
A) a horizontally disposed guide duct having at a first end a polluted air intake and at a second end a clean air outlet;
B) a net cover covering said first end of said guide duct;
C) an induced-draft fan disposed at said first end of said guide duct;
D) a plurality of liquid power sprayers disposed in said guide duct;
E) a suction fan device with splashing nets set removably disposed in said guide duct;
F) a plurality of splashing nets disposed in said guide duct; and
G) a brush type water stopper arranged at said first end of said guide duct;
b) a bag filter device communicating with said liquid power sprayer filter device for cleansing the waste liquid received from said liquid power sprayer filter device; and
c) a water treatment device communicating with said bag filter device for receiving from said bag filter device the liquid treated thereby and further treating said liquid so as to render said liquid suitable to be recirculated for repeated use.

22. The filter system as defined in claim 21, wherein said suction fan device with splashing nets set includes:
a) a plurality of suction fans disposed in a locating frame;
b) a plurality of splashing nets arranged in parallel; and
c) a plurality of parallel, horizontally disposed connecting rods disposed at the periphery of said locating frame, said plurality of suction fans being at first ends of said connecting rods and said plurality of splashing nets being at second ends of said connecting rods.

23. The filter system as defined in claim 22, wherein said plurality of suction fans is proximate said first end of said guide duct and said plurality of splashing nets is disposed proximately inwardly therefrom so that said suction fan device with splashing nets set is pushed into said guide duct.

24. The filter system as defined in claim 21, wherein said brush type water stopper includes:
an arched mounting plate detachably arranged proximate said second end, and a plurality of brushes each having a different length with an end detachable fixed in said arched mounting plate.

25. A filter system for smoke or polluted air, comprising:
a) a liquid power sprayer filter device through which said smoke or polluted air is directed;
b) a bag filter device communicating with said liquid power sprayer filter device for cleansing the waste liquid received from said liquid power sprayer filter device;
c) a water treatment device communicating with said bag filter device for receiving from said bag filter device the liquid treated thereby and further treating said liquid so as to render said liquid suitable to be recirculated for repeated use; and
d) a coarse ash collector communicating with said filter device upstream therefrom for removing large particles of ash or dust from said smoke or polluted air before said smoke or polluted air enters said liquid power sprayer filter device, said coarse ash collector including:
A) a coarse ash collecting unit for collecting large particles of ash or dust in the smoke;
B) a suction unit arranged beneath said coarse ash collecting unit for gathering said large particles of ash or dust in a container; and
C) a cooling unit having dripping water for cooling the heat generated by the smoke in said ash collecting unit.

26. The filter system as defined in claim 25, wherein said coarse ash collector further includes:
a) a collecting cylinder drum having a closed end and a cold air intake end with a plurality of spaced openings at a bottom thereof and a plurality of adjustable openings provided on said cold air intake end, a smoke inlet is disposed proximate said cold air intake end and a smoke outlet is disposed proximate said closed end;
b) a central shaft horizontally extends through said collecting cylinder drum and is supported at a first end by a frame;

c) a plurality of attachment plate sets are spacedly arranged on said shaft in said collecting cylinder drum;
d) a scraping bar set is arranged on said shaft and maintains contact with the inner wall of said collecting cylinder drum; and
e) a driving device coupled to a second end of said central shaft for driving said shaft.

27. The filter system as defined in claim 26, wherein said plurality of attachment plate sets each further comprises:
a) a plurality of attachment plates disposed radially and equiangularly respectively, each of said plurality of attachment plates having two elongated parallel slots; and
b) a plurality of pairs of sliding scraping bars movable secured to each of said plurality of attachment plates and closely contacting the outer surface of each of said plurality of attachment plates respectively through said two parallel slots.

28. The filter system as defined in claim 26, wherein said scraping bar set further comprises:
a) a plurality of transverse scraping bars; and
b) a plurality of radial bars spacedly disposed on said central shaft each having a first end fixed to said central shaft and a second end coupled with a spring, said plurality of transverse scraping bars being connected with respective ones of said springs intervally at a lateral side and pressed by said springs into contact with the inner wall of said collecting cylindrical drum.

29. The filter system as defined in claim 26, wherein said suction unit further comprises:
a) a suction pipe horizontally disposed beneath said collecting cylinder drum having an enclosed end and provided with a plurality of spaced openings at the top to correspond with said plurality of openings located at the bottom of said collecting cylinder drum;
b) a suction pump connected to the other end of said suction pipe; and
c) a filter bag detachably fixed to the outlet of said suction pump.

30. The filter system as defined in claim 29, wherein said filter bag is porous and flexible and provided with multilayers, the innermost layer of said filter bag having the largest mesh size, and the outermost layer of said filter bag having the smallest mesh size.

31. The filter system as defined in claim 26, wherein said cooling unit further comprises:
a) a soaking net adapted to cover the upper outer surface of said collecting cylinder drum;
b) a plurality of collecting troughs disposed at either side of the lower half of the belly of said collecting cylinder drum symmetrically;
c) a water tank disposed proximate said collecting cylinder drum; and
d) a horizontal sprinkling pipe disposed over said soaking net and connected with a plurality of branch pipes intervally at the lateral side, each of said plurality of branch pipes provided with an end connecting the lower part of said water tank and another end at the lateral side of said sprinkling pipe.

32. A filter system for smoke or polluted air, comprising:
a) a liquid power sprayer filter device through which said smoke or polluted air is directed, which comprises
A) a sinuously upwardly extending duct formed by a plurality of transverse duct sections interconnected by a plurality of end connectors forming a plurality of bends, the lowest duct section having an open end forming a draft intake opening proximate to a smoke inlet port and the topmost duct section exhausting to the atmosphere at an unconnected end thereof;
B) a plurality of liquid power sprayer sets disposed vertically in said end connectors and transversely in said duct sections; and
C) a power blowing fan disposed at the draft intake opening of the lowest duct section of said upwardly extending duct;
b) a bag filter device communicating with said liquid power sprayer filter device for cleansing the waste liquid received from said liquid power sprayer filter device, said bag filter device including a plurality of filtering bags spacedly and vertically disposed and detachably fixed to a plurality of connecting pipes respectively, and a collecting pan disposed beneath said plurality of filtering bags with a net stand; and
c) a water treatment device communicating with said bag filter device for receiving from said bag filter device the liquid treated thereby and further treating said liquid so as to render said liquid suitable to be recirculated for repeated use.

33. A filter system for smoke or polluted air, comprising:
a) a liquid power sprayer filter device through which said smoke or polluted air is directed, which comprises
A) a sinuously upwardly extending duct formed by a plurality of transverse duct sections interconnected by a plurality of end connectors forming a plurality of bends, the lowest duct section having an open end forming a draft intake opening proximate to a smoke inlet port and the topmost duct section exhausting to the atmospheric at an unconnected end thereof;
B) a plurality of liquid power sprayer sets disposed vertically in said end connectors and transversely in said duct sections; and
C) a power blowing fan disposed at the draft intake opening of the lowest duct section of said upwardly extending duct;
b) a bag filter device communicating with said liquid power sprayer filter device for cleansing the waste liquid received from said liquid power sprayer filter device; and
c) a water treatment device communicating with said bag filter device for receiving from said bag filter device the liquid treated thereby and further treating said liquid so as to render said liquid suitable to be recirculated for repeated use, said water treatment device including a mixing trough with a mixer, a plurality of sedimentation troughs, and a clean water trough with a plurality of pipes, wherein said mixing trough, said plurality of sedimentation troughs, and said clean water trough connect and communicate with each other sequentially, said plurality of sedimentation troughs each provided with a dust collecting board at the inner bottom, said plurality of pipes in said clean water trough including at least one suction pipe, and a supplementary water supplying pipe with a level control valve.

34. A filter system for smoke or polluted air, comprising:
- a) a liquid power sprayer filter device through which said smoke or polluted air is directed, which comprises
  - A) a sinuously upwardly extending duct formed by a plurality of transverse duct sections interconnected by a plurality of end connectors forming a plurality of bends, the lowest duct section having an open end forming a draft intake opening proximate to a smoke inlet port and the topmost duct section exhausting to the atmosphere at an unconnected end thereof;
  - B) a plurality of liquid power sprayer sets disposed vertically in said end connectors and transversely in said duct sections; and
  - C) a power blowing fan disposed at the draft intake opening of the lowest duct section of said upwardly extending duct;
- b) a bag filter device communicating with said liquid power sprayer filter device for cleansing the waste liquid received from said liquid power sprayer filter device; and
- c) a water treatment device communicating with said bag filter device for receiving from said bag filter device the liquid treated thereby and further treating said liquid so as to render said liquid suitable to be recirculated for repeated use, said water treatment device including a casing having an access door at an upper portion and a central division board separating said casing into two parts, a filter bag disposed at the upper portion in one of said two parts and detachably fixed to a waste liquid pipe, a collecting plate disposed beneath said filter bag, a perforrnated division board disposed at the lower portion parallel to said central division board, a space between said two division boards provided to fill said filter bag, and a plurality of high pressure water pumps disposed at the upper portion in another part, the lower portion in said other part being a clean water trough section, said plurality of water pumps each provided with a suction pipe section extending into said clear water trough section, and a supplementary water supply pipe with a level control valve provided in said clean water trough section.

* * * * *

UNITED STATES PATENT AND TRADEMARK OFFICE
CERTIFICATE OF CORRECTION

PATENT NO. : 5,298,043  
DATED : March 29, 1994  
INVENTOR(S) : Sung-chuan Mai, et al Page 1 of 12

It is certified that error appears in the above-indentified patent and that said Letters Patent is hereby corrected as shown below:

The Drawing Sheets consisting of Figs. 34-43, should be added as shown on the attached pages.

Signed and Sealed this

Twenty-ninth Day of November, 1994

Attest:

BRUCE LEHMAN

*Attesting Officer*     *Commissioner of Patents and Trademarks*